(12) United States Patent
Xie et al.

(10) Patent No.: US 10,791,146 B2
(45) Date of Patent: *Sep. 29, 2020

(54) NETWORK SECURITY FRAMEWORK BASED SCORING METRIC GENERATION AND SHARING

(71) Applicant: Fortinet, Inc., Sunnyvale, CA (US)

(72) Inventors: Michael Xie, Palo Alto, CA (US); Robert A. May, North Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/938,629

(22) Filed: Mar. 28, 2018

(65) Prior Publication Data

US 2018/0324219 A1 Nov. 8, 2018

Related U.S. Application Data

(60) Provisional application No. 62/503,252, filed on May 8, 2017.

(51) Int. Cl.
*H04L 29/06* (2006.01)
*H04W 24/02* (2009.01)
*H04L 12/24* (2006.01)

(52) U.S. Cl.
CPC .............. *H04L 63/20* (2013.01); *H04L 41/12* (2013.01); *H04L 63/0236* (2013.01); *H04L 63/0263* (2013.01); *H04L 63/08* (2013.01); *H04L 63/1408* (2013.01); *H04L 63/1441* (2013.01); *H04W 24/02* (2013.01)

(58) Field of Classification Search
CPC ...... H04W 24/02; H04W 12/06; H04L 63/08; H04L 63/1441; H04L 63/0236; H04L 41/12; H04L 63/0263; H04L 63/20; H04L 63/1408; H04L 63/1433; H04L 63/0209
See application file for complete search history.

(56) References Cited

U.S. PATENT DOCUMENTS 7,493,650 B2    2/2009  Peled et al.
7,512,071 B2 *  3/2009  Goldschmidt .......... H04L 47/10
                                                    370/235
8,990,392 B1    3/2015  Stamos
(Continued)

OTHER PUBLICATIONS

U.S. Appl. No. 15/855,897, filed Dec. 27, 2017.
(Continued)

*Primary Examiner* — Robert B Leung
*Assistant Examiner* — Thomas Ho
(74) *Attorney, Agent, or Firm* — Jaffery Watson Mendonsa & Hamilton LLP

(57) ABSTRACT

Systems and methods are described for analysing, sharing and comparing security configurations. According to one embodiment, a security metric for a network segment of a private network is generated based on determination and analysis of network assets, network topology, and one or more defined security criteria representing security features being implemented by one or more network security devices that form part of the network segment, wherein the scoring metric is a quantitative representation of protection level and/or exposure level of the network segment. In an embodiment, the security metric can be shared and compared with security metrics of other network segments.

24 Claims, 20 Drawing Sheets

(56) References Cited

U.S. PATENT DOCUMENTS

| | | | |
|---|---|---|---|
| 9,264,395 B1* | 2/2016 | Stamos | H04L 61/1511 |
| 9,342,691 B2* | 5/2016 | Maestas | H04L 63/0236 |
| 9,503,477 B2 | 11/2016 | May et al. | |
| 9,608,961 B2* | 3/2017 | Yin | H04L 63/0236 |
| 10,454,935 B2* | 10/2019 | Parimi | G06N 20/00 |
| 2002/0069200 A1* | 6/2002 | Cooper | H04L 41/0609 |
| 2005/0257267 A1* | 11/2005 | Williams | H04L 63/0227 726/25 |
| 2006/0064484 A1* | 3/2006 | Fawcus | H04L 45/00 709/224 |
| 2006/0094400 A1* | 5/2006 | Beachem | H04L 63/101 455/410 |
| 2006/0182034 A1* | 8/2006 | Klinker | H04L 43/00 370/238 |
| 2006/0271677 A1* | 11/2006 | Mercier | G06F 16/1824 709/224 |
| 2008/0162452 A1* | 7/2008 | Cox | H04L 41/0893 |
| 2009/0024663 A1* | 1/2009 | McGovern | G06F 21/577 |
| 2012/0297042 A1* | 11/2012 | Davis | H04L 63/164 709/223 |
| 2014/0013434 A1* | 1/2014 | Ranum | H04L 63/145 726/24 |
| 2014/0254592 A1 | 9/2014 | Olofsson et al. | |
| 2015/0372977 A1* | 12/2015 | Yin | H04L 63/0236 726/1 |
| 2017/0353459 A1* | 12/2017 | Lawrence | H04L 63/10 |
| 2018/0027004 A1* | 1/2018 | Huang | H04L 43/08 726/23 |
| 2018/0027006 A1 | 1/2018 | Zimmerman et al. | |
| 2018/0063082 A1 | 3/2018 | Nenov | |
| 2018/0152466 A1* | 5/2018 | Sartran | H04L 63/1425 |
| 2018/0324147 A1* | 11/2018 | Li | H04L 63/1441 |
| 2018/0324217 A1* | 11/2018 | Xie | H04L 63/1441 |
| 2018/0324218 A1* | 11/2018 | Xie | H04L 63/08 |
| 2019/0007418 A1* | 1/2019 | Cook | H04L 63/105 |
| 2019/0089740 A1* | 3/2019 | Hastings | H04L 63/20 |

OTHER PUBLICATIONS

U.S. Appl. No. 15/855,230, filed Dec. 27, 2017.
Non-Final Office Action for U.S. Appl. No. 15/855,897, dated Jan. 16, 2020, 24 pages.

* cited by examiner

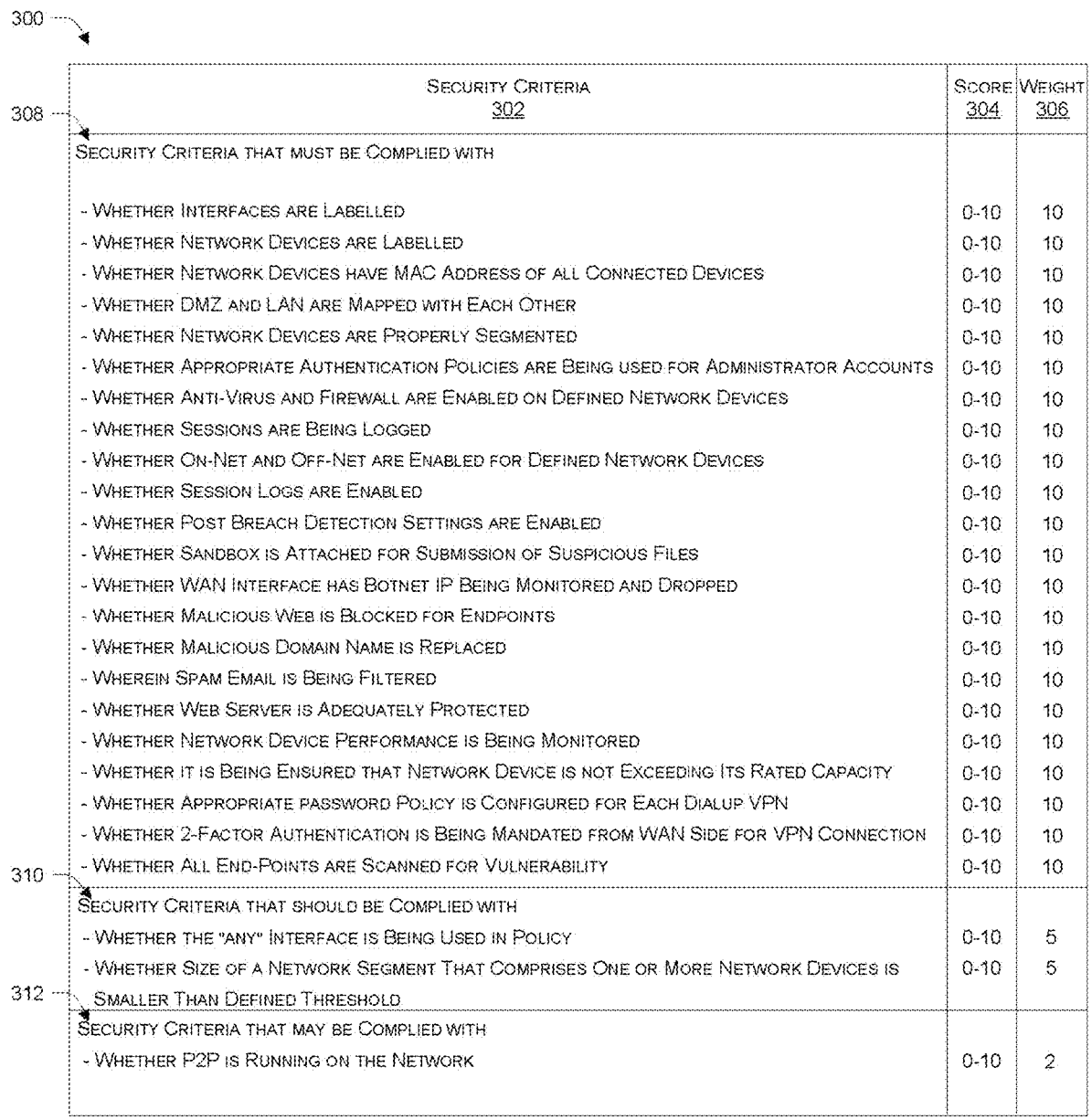

| Security Criteria 302 | Score 304 | Weight 306 |
|---|---|---|
| Security Criteria that must be Complied with | | |
| - Whether Interfaces are Labelled | 0-10 | 10 |
| - Whether Network Devices are Labelled | 0-10 | 10 |
| - Whether Network Devices have MAC Address of all Connected Devices | 0-10 | 10 |
| - Whether DMZ and LAN are Mapped with Each Other | 0-10 | 10 |
| - Whether Network Devices are Properly Segmented | 0-10 | 10 |
| - Whether Appropriate Authentication Policies are Being used for Administrator Accounts | 0-10 | 10 |
| - Whether Anti-Virus and Firewall are Enabled on Defined Network Devices | 0-10 | 10 |
| - Whether Sessions are Being Logged | 0-10 | 10 |
| - Whether On-Net and Off-Net are Enabled for Defined Network Devices | 0-10 | 10 |
| - Whether Session Logs are Enabled | 0-10 | 10 |
| - Whether Post Breach Detection Settings are Enabled | 0-10 | 10 |
| - Whether Sandbox is Attached for Submission of Suspicious Files | 0-10 | 10 |
| - Whether WAN Interface has Botnet IP Being Monitored and Dropped | 0-10 | 10 |
| - Whether Malicious Web is Blocked for Endpoints | 0-10 | 10 |
| - Whether Malicious Domain Name is Replaced | 0-10 | 10 |
| - Wherein Spam Email is Being Filtered | 0-10 | 10 |
| - Whether Web Server is Adequately Protected | 0-10 | 10 |
| - Whether Network Device Performance is Being Monitored | 0-10 | 10 |
| - Whether it is Being Ensured that Network Device is not Exceeding Its Rated Capacity | 0-10 | 10 |
| - Whether Appropriate password Policy is Configured for Each Dialup VPN | 0-10 | 10 |
| - Whether 2-Factor Authentication is Being Mandated from WAN Side for VPN Connection | 0-10 | 10 |
| - Whether All End-Points are Scanned for Vulnerability | 0-10 | 10 |
| Security Criteria that should be Complied with | | |
| - Whether the "any" Interface is Being Used in Policy | 0-10 | 5 |
| - Whether Size of a Network Segment That Comprises One or More Network Devices is Smaller Than Defined Threshold | 0-10 | 5 |
| Security Criteria that may be Complied with | | |
| - Whether P2P is Running on the Network | 0-10 | 2 |

| Security Criteria 402 | Network Segment 1 404 | Network Segment 2 406 |
|---|---|---|
| Whether Interfaces are Labelled | 7 | 9 |
| Whether Network Devices are Labelled | 8 | 6 |
| Whether Network Devices have MAC Address of All Connected Devices | 5 | 8 |
| Whether DMZ and LAN are Mapped with Each Other | 4 | 7 |
| Whether Network Devices are Properly Segmented | 7 | 7 |
| Whether Appropriate Authentication Policies are Being Used for Administrator Accounts | 6 | 8 |
| Whether Anti-Virus and Firewall are Enabled on Defined Network Devices | 0 | 10 |
| Whether Sessions are Being Logged | 5 | 5 |
| Whether On-Net and Off-Net are Enabled for Defined Network Devices | 7 | 8 |
| Whether Session Logs are Enabled | 6 | 5 |
| Score 408 | 55% | 75% |

GOALS PROFILES
752

754 ──▶ + ADD NEW

| PROFILE NAME 756 | | |
|---|---|---|
| LAN 758a | EDIT | DELETE |
| DMZ 758b | EDIT | DELETE |

| ASSIGN GOALS/PROFILE TO NSD INTERFACE 760 | | |
|---|---|---|
| DEVICE 762 | INTERFACE 764 | GOALS/PROFILES 766 |
| NETWORK SECURITY DEVICE 1 | PORT 1 | LAN ▼ |
| | PORT 2 | DMZ ▼ |
| | PORT 3 | LAN ▼ |
| NETWORK SECURITY DEVICE 2 | PORT 4 | DMZ ▼ |
| | PORT 5 | LAN ▼ |
| | PORT 6 | DMZ ▼ |
| NETWORK SECURITY DEVICE 3 | PORT 7 | LAN ▼ |
| | PORT 8 | LAN ▼ |

| NETWORK SECURITY DEVICE 802 | LAN SEGMENT 804 | ACTION 806 |
|---|---|---|
| NETWORK SECURITY DEVICE 1 | PORT 8 | TO MEET THE VULNERABILITY SCAN AND PATCH MANAGEMENT GOAL, WE RECOMMENDED TO INSTALL NETWORK SECURITY DEVICE ON ALL HOSTS IN THIS NETWORK<br><br>UNPROTECTED HOSTS DETECTED:<br>- WINDOWS-JJONES (192.168.8.4)<br>- WINDOWS-RHANDERSON (192.168.8.5)<br>- WINDOWS-LTOMLINSON (192.168.8.6)<br>- MAC-JWHITTLE (10.44.8.1)<br>- MAC-MVAUGHAN (10.44.8.2)<br>- MAC-RSMITH (10.44.8.3) |
| NETWORK SECURITY DEVICE 2 | PORT 4 | TO MEET THE HOST ANTI-VIRUS GOAL, WE RECOMMENDED TO INSTALL NETWORK DEVICE ON ALL HOSTS IN THIS NETWORK<br><br>UNPROTECTED HOSTS DETECTED:<br>- WINDOWS-KAMARWAH (192.11.12.4)<br>- WINDOWS-RHANDERSON (192.11.12.5) |

| PERFORMANCE RECOMMENDATION | |
|---|---|
| NETWORK SECURITY DEVICE<br>902 | PERFORMANCE RECOMMENDATIONS<br>904 |
| NETWORK SECURITY DEVICE 1 | WE HAVE DETECTED CONTINUOUS HIGH CPU AND MEMORY USAGE ON THIS NETWORK<br><br>SECURITY DEVICE<br>- CPU AVERAGE USAGE OF 91% OVER PAST 24 HOURS<br>- MEMORY AVERAGE USAGE OF 95% OVER PAST 24 HOURS<br><br>WE RECOMMEND TO UPGRADE THIS NODE TO A HIGHER CAPACITY NETWORK DEVICE |
| NETWORK SECURITY DEVICE 2 | WE HAVE DETECTED THAT TRAFFIC LOGGING VOLUME ACROSS ALL NETWORK DEVICES<br><br>EXCEEDS THE RECOMMENDED LOG RATE FOR YOUR NETWORK DEVICE:<br>- ACTUAL LOG RATE OVER PAST 24 HOURS – 15,501 LOG/SEC<br>- RECOMMENDED LOG RATE FOR FAZ 1000D – 12,000 LOG/SEC<br><br>WE RECOMMEND UPGRADING TO A HIGHER END NETWORK DEVICE, OR USING COLLECTOR/<br>ANALYZER MODE WITH MULTIPLE NETWORK DEVICES TO DISTRIBUTE THE LOG COLLECTION |

| CONFIGURATION RECOMMENDATIONS 952 ||||
|---|---|---|---|
| NETWORK SECURITY DEVICE 954 | LAN SEGMENT 956 | SUMMARY 958 | ACTION 960 |
| NETWORK SECURITY DEVICE 1 | PORT 1 | TO MEET THE NETWORK ANTIVIRUS GOAL, WE RECOMMEND TO SETUP AN ANTI-VIRUS PROFILE ON POLICIES 1 AND 14 | Go |
| NETWORK SECURITY DEVICE 2 | PORT 1 | TO MEET MALICIOUS WEBSITE BLOCKING GOAL, WE RECOMMEND TO SETUP AN ANTIVIRUS PROFILE ON POLICIES 1 AND 14 | Go |
| NETWORK SECURITY DEVICE 3 | -- | TO MEET THE NETWORK ANTIVIRUS GOAL, WE RECOMMEND ACTIVATING THE ANTI-VIRUS SERVICE ON NETWORK SECURITY DEVICE 1500D AND NETWORK SECURITY DEVICE 60D | Go |
| NETWORK SECURITY DEVICE 4 | PORT 4 | TO MEET THE COMPROMISED HOST (BOTNET C&C) GOAL, WE RECOMMEND TO ENABLE BOTNET SCANNING ON PORT 3 | Go |
| NETWORK SECURITY DEVICE 5 | PORT 4 | TO MEET THE COMPROMISED HOST (BOTNET C&C) GOAL, WE RECOMMEND TO ENABLE BOTNET DNS PROFILE ON POLICY 148 | Go |
| NETWORK SECURITY DEVICE 6 | PORT 7 | TO MEET THE WEBFILTER CONTENT GOAL, WE RECOMMEND TO ENABLE A WEB FILTER PROFILE THAT BLOCKS PORNOGRAPHY AND GAMBLING FOR POLICY IDs 12, 47, 48, 49 AND 50 | Go |
| NETWORK SECURITY DEVICE 7 | -- | TO GAIN BETTER REPORTING AND VISIBILITY, WE RECOMMEND TO ENABLE LOGGING ON POLICY IDs 12, 14, 88, 89, 97, 104 AND 121 | Go |

FIG. 9B

NETWORK SECURITY FRAMEWORK BASED SCORING METRIC GENERATION AND SHARING

CROSS-REFERENCE TO RELATED PATENTS

This application claims the benefit of priority of U.S. Provisional Application No. 62/503,252, filed on May 8, 2017, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to network security performance analysis. In particular, embodiments of the present invention relate to systems and methods for evaluating the security of a network or a part thereof relative to the environment at issue and/or relative to the security configurations of participating third parties.

Description of the Related Art

In order to provide security to network devices, an enterprise network and/or to a data center, there are several security features that are implemented at different layers. Security features are enabled by installing different network security devices and applications operating at different network layers to provide multi-layer security. A typical enterprise buys and deploys a number of security products, including, but not limited to intrusion detection devices, intrusion prevention device, content filtering devices, anti-malware devices, antispam devices, devices having Virtual Private Networking (VPN) capabilities, network traffic/event logging devices, identity-based access control devices, Data Leak Prevention (DLP) devices, load balancing devices, Quality of Service (QoS) evaluating devices, Secure Socket Layer (SSL)/Secure Shell (SSH) inspection and application control devices.

However, the network administrator has no way to understand how secure the enterprise network really is. For example, the network administrator has no mechanism to evaluate whether the security features installed or active on a particular network security device or established as part of a network security policy are sufficient, or whether the security features are in-line with industry best practices or whether the security features are collectively on par with acceptable security levels when compared to what others in the industry are doing based on their relative size, geography and/or other factors.

Therefore, there exists a need for a system and method for generating, analyzing and sharing security scores/metrics for private networks or parts thereof that are indicative of a security level for a given private network or part thereof relative to their own environment and/or relative to security configurations being implemented by participating third parties based on their respective industries, relative sizes, geography and like factors.

SUMMARY

Systems and methods are described for analyzing, sharing and comparing security configurations. According to one embodiment, information regarding one or more security goals for and to be associated with a network segment of a private network of an enterprise is received by a network security device of the private network. Multiple security criteria are identified by the network security device based on the one or more security goals. A topology of the network segment is discovered by the network security device. Security policies implemented by one or more network security devices that form part of the network segment are learned by the network security device. Multiple scores, including a score for each of the multiple identified security criteria are determined by the network security device by: (i) analyzing traffic passing through the network segment and observing behaviors of the one or more network security devices responsive thereto; (ii) analyzing respective system configurations of the one or more network security devices; (iii) parsing and evaluating the security policies; and (iv) evaluating performance of the security policies based on the traffic and the observed behaviors. An understanding of the overall security posture of the network segment by a network administrator of the private network is facilitated by generating a scoring metric representative of the overall security posture of the network segment based on the multiple scores.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 illustrates exemplary security features and their respective weightings for determining a security score of a network or a part thereof in accordance with an embodiment of the present invention.

FIG. 4A illustrates exemplary scoring metrics generated for two network segments in accordance with an embodiment of the present invention.

FIG. 7B depicts a user interface screen of a network security device illustrating exemplary goal profiles that can be assigned to one or more network devices in accordance with an embodiment of the present invention.

FIG. 8 depicts a compliance report illustrating exemplary security loopholes and/or critical issues in accordance with an embodiment of the present invention.

FIG. 9A depicts a performance recommendation report illustrating exemplary performance optimization recommendations in accordance with an embodiment of the present invention.

FIG. 9B depicts a configuration recommendation report illustrating exemplary configuration recommendations in accordance with an embodiment of the present invention.

DETAILED DESCRIPTION

Figure 1:
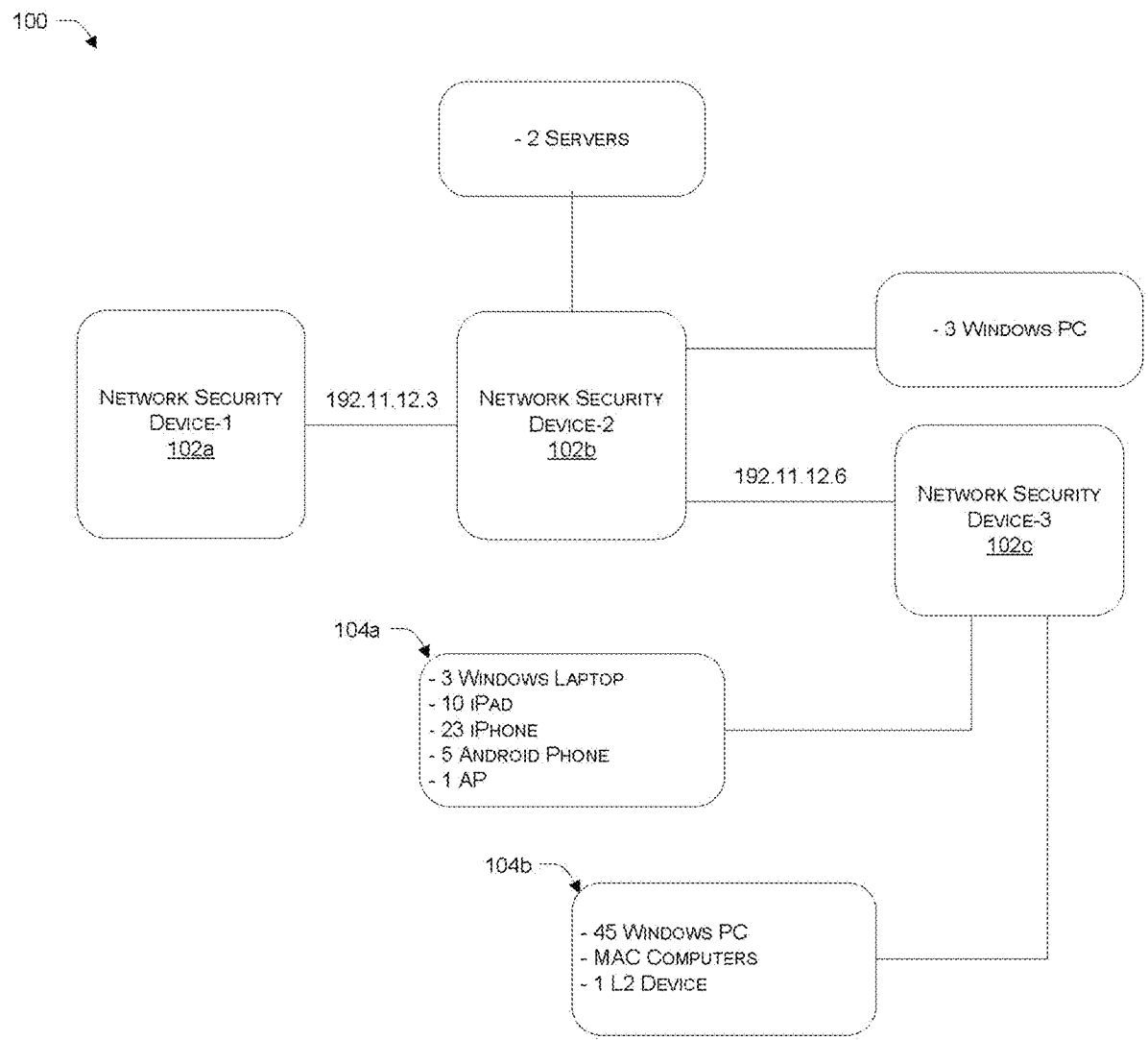
FIG. 1 illustrates an exemplary network topology in accordance with an embodiment of the present invention.

Systems and methods are described for analyzing, sharing and comparing security configurations. Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Systems and methods are described for analyzing, sharing and comparing security configurations. According to one embodiment, a security metric for a network segment of a private network is generated based on determination and analysis of network assets, network topology, and one or more defined security criteria representing security features being implemented by one or more network security devices that form part of the network segment, wherein the scoring metric is a quantitative representation of protection level and/or exposure level of the network segment. In an embodiment, each criterion of the one or more defined security criteria may have a weight assigned and a score again each criterion of the one or more defined security criteria is determined based on analysis of the network segment. In an embodiment, the weight is assigned to a security criterion based on importance of the respective security criterion, and wherein the scoring metric is generated based on the weighted security criterion.

In an embodiment, one or more defined security criteria based on which the scoring metric is generated can be determined based on user defined security goals. The security goals can be created for and associated to the network segment by a user, or can be automatically created and associated based on matching of the network segment with other network segments of similar type, size or purpose. Each criterion of the one or more defined security criteria is categorized into must-have category, should-have category, or may-have category based on how important is it for the at least a part of the network to meet the criterion. Scoring metric can be generated based on determination of how many must-have category, should-have category and may-have category security criteria are met.

In an embodiment, the security metric can be shared and compared with security metrics of other network segments. Two or more scoring metrics associated with different network segments can be compared to highlight one or more defined security criteria where the network segment being analyzed is scoring low or high. The security metric can be shared across a community network, wherein the security metric of the network segment can be compared and discussed by network admins to improve the overall security of the network segment. In an embodiment, the scoring metric can be shared anonymously with network administrator across the network segment and other network segments of same network.

Comparison between two or more scoring metrics can be performed based on filter parameters selected from any or a combination of type of network, type of network devices that form part of the network, geography, network topology, company to which the network pertains, industry to which the network pertains, network density, network size, one or more security goals, and a network configuration attribute. One or more filter parameters can be selected automatically based on description of the network segment. In an embodiment, other network segments whose scoring metrics can be compared with the scoring metric of the network segment can be determined based on the description of the network segment. Description of the network segments may include network parameters, such as of type of network, type of network devices that form part of the network, geography, network topology, company to which the network pertains, industry to which the network pertains, network density, network size, one or more security goals, and a network configuration attribute.

The network devices forming part of the network can be any or combination of portable computing devices, network management devices, network security devices, firewalls, routers, switches, access points, gateway devices, intrusion prevention systems (IPSs), and intrusion detection systems (IDSs), and Unified Threat Management (UTM) devices.

In some embodiments, the one or more defined security criteria can be based on any or combination of whether interfaces are labeled, whether network devices are labeled, whether network devices have Media Access Control (MAC) addresses, whether the Demilitarized Zone (DMZ) and the Local Area Network (LAN) are mapped with each other, whether network devices of different types form part of a single segment, whether appropriate authentication policies are being used for administrator accounts, whether anti-virus and firewall functionality are enabled on defined network devices, whether sessions are being logged, whether On-Net and Off-Net are enabled for defined network devices, whether post breach detection settings are enabled, whether a sandbox is available for submission of suspicious files, whether the Wide Area Network (WAN) interface has BOTNET Internet Protocol (IP) addresses being monitored and dropped, whether malicious websites are blocked for endpoints, whether malicious domain names are replaced, wherein SPAM and malicious email is being filtered, whether the web server is adequately protected against Distributed Denial of Service (DDoS) attacks, whether network device performance is being monitored, whether it is being ensured that network security devices are not exceeding their respective rated capacities, whether appropriate password policy is configured for each Dialup Virtual Private Network (VPN), whether 2-factor authentication is being mandated from the WAN side for VPN connections, whether all end-points are being scanned for vulnerabilities, whether any interfaces that are not labeled are being used in a security policy, whether the size of a network segment that comprises one or more network devices is smaller than a defined threshold, and whether peer-to-peer (P2P) protocols or applications are running on the network.

In some embodiments, multiple network security devices can be configured in a network segmentation tree (NST) format, wherein the NST can be constructed based on hierarchical interconnections among the network security devices deployed within a protected network by determining a relative position of each of the network devices within the NST based on at least one identifier associated with the respective network device, wherein each node of the NST represents a network device of the multiple network security devices and each node of the NST, except a root node of the NST and leaf-nodes of the NST, has one parent node and one or more child nodes, and wherein nodes of the NST are constrained so as to allow only a parent node to query its child nodes.

FIG. 1 illustrates an exemplary network topology in accordance with an embodiment of the present invention. As shown in FIG. 1, a private network 100, which can be an enterprise network, a university network, secured government network etc, may have several network devices connected with each other through different arrangements. The arrangement of the network devices is referred in general as network topology. In another words, the network topology is an arrangement of various network devices (connecting links, nodes, network security device etc) of a computer network. A typical protected network may have several network devices, which may also be referred to interchangeably herein as network elements or network nodes, such as endpoints, network assets, network security devices, networking devices, databases, servers, utility devices, end user devices, portable computing devices, network assets, network management devices, network security devices, firewalls, routers, switches, access points, gateway devices, IPSs, IDSs, UTM devices and network management devices. Network topology provides a physical or logical representation of how these network devices are arranged or connected in the network. Depending on the various requirements of the protected network, these network devices can be arranged in a variety of different topologies, for example ring, mesh, start, fully connected, line, tree and bus. So, discovery of network topology may be required to understand where these network devices are placed relative to each other, what function these network devices are performing, and to understand interworking of different security measures (applied in the form of security policies) applied on a network, to ensure security compliance of a protected network with respect to a pre-defined or a given security goal, for example. To meet different security goals, different network topology can put in place.

As different network security measures take place at different layers on different network devices, discovery of network topology may be required to monitor and ensure compliance of security goals and ensure that the network devices, individually and/or collectively, are performing the required/desired security enabling functions in an efficient manner.

As shown in FIG. 1, network security device-1 102a can be connected to network security device-2 102b, which in-term can be connected to different servers (for example, 2 servers), end user devices (for example, 3 windows PCs), and another network security devices-3 102c. Network security device-3 102c can be connected to different network devices of different network segments, for example network segment 104a, and network segment 104b. As shown in here, each network segments 104a-b may include multiple network devices. For example, network segment 104a may have windows laptops, 10 iPads, 23 iPhones, 5 Android phones, and 1 Access Point (AP) and network segment 104b may have 45 Windows PCs, several MAC computers, and 1 layer-2 network device. Each of the network security device-1 102a, network security device 102b and network security device 102c, collectively and interchangeably referred as network security devices 102, may have security measures implemented to prevent the network or the part thereof from different vulnerabilities.

Figure 2:
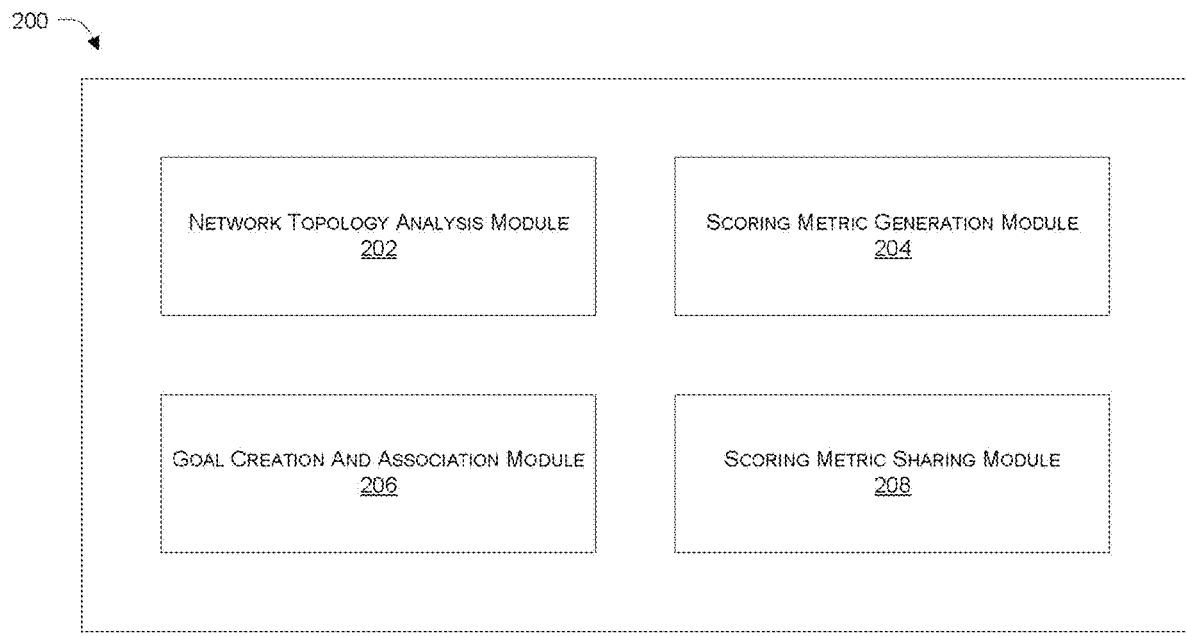
FIG. 2 illustrates exemplary functional modules of a system for generating and sharing network security framework based scoring metrics in accordance with an embodiment of the present invention.

FIG. 2 illustrates exemplary functional modules of a system for generating and sharing network security framework based scoring metrics in accordance with an embodiment of the present invention. System 200 can learn security policies implemented on network devices that form part of a particular network segment or portion thereof, analyze traffic flow, configuration of the network segment and performance of the security policies. In an embodiment, based on the analysis of the network topology, security policies being implemented on network devices, performance of security policy by different network assets, system 200 can generate a scoring metric. The security metric may be a quantitative representation of the protection level and/or exposure level of the network segment. System 200 includes a network topology analysis module 202 configured to discover and analyze topology of a network segment of a private network and a scoring metric generation module 204 configured to generate a scoring metric for the network segment based on the topology analysis and further based on one or more defined security criteria. As those of ordinary skill in the art will appreciate, the private network may include several network devices that are operatively coupled with each other.

In an embodiment, system 200 further includes a goal creation and association module 206 configured to enable a user to create one or more security goals or select one or more security goals from a list of pre-defined security goals and associate the one or more security goals to with the network segment based on which the one or defined security criteria are defined or selected. In an embodiment, the one or more defined security criteria can be selected automatically by system 200 based on the one or more security goals defined for the network segment.

System 200 further includes a scoring metric sharing module 208 configured to enable sharing of the scoring metric in a community and further enable comparison of two or more scoring metrics.

In an embodiment, module 202 can identify network devices, also referred interchangeably as network assets, such as guest computers, portable devices, workstations, laptops, printers, servers (e.g., web, application and email servers), data storage devices, network security devices etc. Module 202 can analyze traffic flow and determine network topology. In an embodiment, network topology can be determined based on analysis of the traffic logs. Module 202 can learn network topology of a network segment of a private network. Module 202 can enable discovery of topology of at least one network segment of a network, and learn security policies implemented in network devices that form part of the network segment.

In an exemplary implementation, system 200 can use a network segment tree (NST), which may also be referred to interchangeably herein as a Cooperative Security Fabric (CSF), that spans across an entire network, using network telemetry to link different security devices, security sensors and tools together to collect, coordinate, and respond to different network activities in real time. Each intermediate node in the network may be aware of downstream network topology, along with being aware of its connected downstream network security devices, and its parent node. In an exemplary implementation, network topology can be discovered using a suitable network discovery protocol.

Module 202 can determine how different network security devices are connected to each other, where they are located and other such attributes of the network devices. In an exemplary implementation, a network traffic log can be used to determine the types of network devices. For example, using the traffic log, module 202 can determine whether a network device is a router, a switch, a Network Address Translation (NAT) device, or an end user device. For example, if traffic coming from a network device indicates different source IP addresses but one MAC address, module 202 can determine that the traffic is coming from a router. Similarly, if the traffic specifies one MAC address and one IP address but changing device type, module 202 can determine that the traffic is coming from a NAT device. Module 202 can discover the network topology and present a graphical representation thereof. In an exemplary embodiment, module 202 can enable a user to browse-through the network using a user interface. In an exemplary implementation, the browse-through user interface can allow a user to see different malware that has been detected, infected network devices, infected network segments, and all such threats/vulnerabilities in the network.

In an exemplary implementation, network topology analysis module 202 can store network topology information in a network segmentation tree (NST) format. In an implementation, the NST can be constructed based on analysis of the hierarchical interconnections among multiple network devices deployed within a protected network by determining a relative position of each of the network devices within the NST based on at least one identifier associated with the respective network device. In some embodiments, different network devices can be configured to exchange information. For example, the network devices can exchange configuration information, performance related information, and information related to network topology discovery to enable comparison across the network. Network topology can be discovered accordingly. In another aspect, the CSF can be constructed by determining relative positions of each network security device within the CSF based on at least one identifier, such as an IP address, a type of NSD, the serial number of the NSD, a manufacturing year/date/time of the NSD, functionality of the NSD, location/position/configuration of the NSD in the network, importance of the NSD in the network, among other like parameters. Each network security device, except root node network security device and leaf-node network security devices, can be configured to have a single parent node and one or more child nodes, and each NSD of the CSF can be constrained to allow queries to be issued only in the downstream direction.

Network topology analysis module 202 can be configured to learn security policies implemented in network devices that form part of the at-least one network segment. A suitable protocol or API, for example a Representational State Transfer (REST) or RESTful API can be used to exchange information among network devices.

Module 204 can be configured to generates a scoring metric based on the analysis performed by module 202. In an embodiment, one or more security criteria can be defined or selected automatically based on some initial understanding of the network segment at issue. Each criterion of the one or more defined security criteria may have a weight assigned thereto, and the weight can be assigned to a security criterion based on the relative importance of the respective security criterion, and wherein the scoring metric is generated based on the weighted security criterion. In an embodiment, the importance of each of the security criteria can be determined based on one or more network security goals associated with the network segment, and hence the weight of each of security criteria can also be dynamically adjusted. In an embodiment, each criterion of the one or more defined security criteria can be categorized into a must-have category, a should-have category, or a may-have category based on how important is it for the portion of the network at issue to meet the criterion. If module 204 identifies based on the analysis of the traffic within the network segment that a must-have criteria is not met, module 204 can assign a low score for that criteria. As those of ordinary skill in the art will appreciate, a security criteria classified under the must-have category will have a relatively higher weight in comparison to a security criteria classified under the should-have category. Similarly, a security criteria classified under the should-have category will have a relatively higher weight in comparison to a security criteria classified under the may-have category.

In an embodiment, module 204 can generate the scoring metric based on analysis of different security associated configurations across different network devices of the network segment. Module 204 can assign scores or points for each of the security criteria evaluated. System 200 can be configured to perform an analysis of traffic passing through the network segment, and determine how the network segment is performing against the one or more security criteria. System 200 can analyze the traffic flow and determine where and how different network security policies or security criteria are being applied. System 200 can analyze which features, ports, security measures are enabled or disabled on different network security devices associated with the network segment at issue. For a selected network segment, the system can perform analysis of security criteria being met by different network devices of the selected network segment. System 200 can perform different analysis based on headers of packets or the traffic log maintained at connected network devices.

In an embodiment, module 204 can generate a scoring metric for the network segment based on the determined scores for each of the one or more defined or selected security criteria. In an embodiment, a set of security criteria can be selected from a list of criteria based on a security goal assigned for the network segment. System 200 can perform evaluation again each of the one or more defined security criteria based on the analysis performed by module 202 and can assign a score for each of security criteria. Based on the network topology analysis and score generated by the module 204 for each of the one or more defined security criteria a scoring metric can be generated. In an embodiment, a cumulative score can be generated for the network segment based on the calculated score and weighting factor of each of the one or more defined security criteria. In an embodiment, different security criteria can be defined or selected for generating the scoring metric for the network segment.

In an exemplary implementation, goal creation and association module 206 can enable a user to define one or more security goals or select one or more security goals from a list of pre-configured security goals to be associated with the network segment to be evaluated. Based on these selected or defined security goals, one or more security criteria to be used for generating the scoring metric for the network segment can be defined. The system can be configured to check for the one or more defined security criteria and generate a scoring metric for the network segment. A security goal can relate to intrusion prevention, blocking of BOTNETs etc. Any security goals in the form of one or more security rules to be applied can be created and associated a network segment. As those of skill in the art will appreciate, for different network segments, different network goals can be created. For example, a network segment that includes critical databases, servers etc. of the organization may have different security goals as compared to network segments that simply allow access by guest devices. Module 206 can enable an administrative user to create one or more security goals for a selected segment by recommending different security attributes and one or more security goals retrieved from highly scored network segments (within the enterprise or within the participating community among which security posture information is being anonymously shared) that are similar in nature to the selected network segment. In an embodiment, based on of the one or more defined goals for the network segment, one or more security criteria can be defined.

Further, scoring metric sharing module 208 can enable sharing of the scoring metric as generated by module 204 via an intranet or via the Internet (e.g. through a cloud service). Module 208 can enable sharing of scoring metric through a user interface, where the scoring metric generated by module 208 can be compared with scoring metrics of similar network segments represented within the sharing community. In an embodiment, the similarity of network segments can be determined based on various parameters, including, but not limited to, the type of network, they types of network devices that form part of the network, geography, network topology, the type of company to which the network pertains, the industry to which the network pertains, the network density, the network size, and a network configuration attribute. Scoring metrics including the scoring metric generated for the network segment and those of third parties participating in the sharing community can be compared based on filter parameters selected from any or a combination of the type of network, they types of network devices that form part of the network, geography, network topology, the type of company to which the network pertains, the industry to which the network pertains, the network density, the network size, and a network configuration attribute.

In an embodiment, system 200 can generate test traffic and check if the traffic is being allowed or blocked by different network devices as intended according to the one or more defined security criteria. System 200 can determine scores for each of the security criteria based on analysis of the test traffic and behaviors responsive thereto, wherein the analysis is performed to determine how the network devices are configured and how the network devices are performing against the one or more defined security criteria. System 200 can also check the compliance of the created security criteria individually or collectively by one or more network devices of a selected network segment.

In some aspects, system 200 can further determine and report issues highlighting reasons for non-compliance, if the security polices do not comply with at least one security rule of the security goal. System 200 can report one or more security criteria that are causing a low score to be generated for the network segment. In an embodiment, system 200 can highlight one or more devices that is causing the low score. In an embodiment, system 200 can highlight which network nodes are causing low scores for security criteria classified under the must-have category.

In an aspect, system 200 can generate a report that can include the discovered topology of the network segment at issue, the associated security goal, at least one security rule associated with the network segment, one or more defined security criteria for the network segment, the issues highlighting reasons for non-compliance, and one or more recommendations for addressing the issues. The scores for each of the defined security criteria can be individually be reported. The report can provide a graphical representation of the network, highlighting network devices, or causes of non-compliance, or network devices causing low scores for any of the defined security criteria.

In some embodiments, system 200 can generate at least one recommendation for implementing a change to the security setting based on the issues as determined. The recommendations can be generated to increase the score against each of the one or more defined security criteria.

As those skilled in the art will appreciate, network devices forming part of the network segment can be selected from a group of devices including one or combination of portable computing devices, network management devices, network security devices, firewalls, routers, switches, access points, gateway devices, intrusion prevention systems (IPSs), and intrusion detection systems (IDSs), and Unified Threat Management (UTM) devices.

FIG. 3 illustrates a table 300 of exemplary security features and their respective weightings for determining a security score of a network or a part thereof in accordance with an embodiment of the present invention. As shown in FIG. 3, each of the predefined or configurable security criteria 302 can be associated with one of a must-have category 308, a should-have category 310 and a may-have category 312. Must-have category 308 includes those security criteria 302 that are thought to be of relatively high importance to network security, should have category 310 includes those security criteria 302 that are thought to be of relatively lesser importance to network security and may-have category 312 includes those security criteria 302 that are thought to be of relatively low importance to network security. Weight 206, also referred as multiplication factor, can be assigned for each of security criteria 302. Because of their relative importance, a weight 306 of a security criteria 302 classified in must-have category 308 will be relatively higher than that of a security criteria 302 classified in should-have category 310. Similarly, a weight 306 of a security criteria 302 classified in should-have category 301 will be relatively higher that that of a security criteria 302 classified in the may-have category.

In one embodiment, a scoring metric can be generated for a particular security criteria by multiplying a score 304 assigned to the particular security criteria by a weight assigned to the particular security criteria. In the context of the present example, security criteria 302 include one or more of whether interfaces are labeled, whether network devices are labeled, whether network devices have MAC address of all connected devices, whether DMZ and LAN are mapped with each other, whether network devices of different types form part of a single segment, whether appropriate authentication policies are being used for administrator accounts, whether anti-virus and firewall features are enabled on defined network devices, whether sessions are being logged, whether On-Net and Off-Net are enabled for defined network devices, whether post breach detection settings are enabled, whether sandboxing is available for submission of suspicious files, whether the WAN interface has BOTNET IPs being monitored for and dropped, whether malicious websites are being blocked for endpoints, whether malicious domain name is replaced, wherein SPAM and malicious email is being filtered, whether the web server is adequately protected (e.g., against DDoS attacks), whether network device performance is being monitored, whether it is being ensured that network security devices are not exceeding their rated capacities, whether appropriate password policy is configured for each Dialup VPN, whether 2-factor authentication is being mandated from the WAN side for VPN connections, whether all end-points are scanned for vulnerabilities, whether the "ANY" interface is being used in the definition of a security policy, whether the size of a network segment that comprises one or more network devices is smaller than a defined threshold, and whether a P2P protocol or application is running on the network. As those skilled in the art will appreciate, these security criteria are exemplary in nature and not intended to be limiting. As such, these and other security criteria may be defined for generating the scoring metric. Based on analysis of the traffic within the network segment, a score 304 for each of the security criteria can be determined and hence the scoring metric (representing an average score or aggregate score) can be generated. In an embodiment, the scoring metric can be shared anonymously with the community of participating third parties.

FIG. 4A illustrates a table 400 of exemplary scoring metrics generated for two network segments in accordance with an embodiment of the present invention. The scoring metric may be generated for different network segment using the same set of security criteria. As shown in FIG. 4A, for each of a defined set of security criteria 402 a score can be calculated respectively for a first network segment—network segment 1 404; and for a second network segment—network segment 2 406. A cumulative score 408 representing compliance with all security criteria be calculated for both network segment 404 and 406. For example, cumulative score 408 for network segment 1 404 is 55% and cumulative score for network segment 2 406 is 75%.

Scores for each security criteria 402 for a network segment can be determined proportionate to the observed compliance. For example, if 90% of the interfaces are labelled properly as in the case of network segment 2 404 the score for the security criteria "whether interfaces are labelled" can be scored as a 9 out of the maximum score of 10. For the same security criteria "whether interfaces are labelled" for network segment 1 402, the score can be 7, representing the fact that only 70% of the interfaces of network segment 402 are labeled. In alternative embodiments, predetermined and/or configurable compliance ranges can be associated with appropriate scores.

Figure 4B:
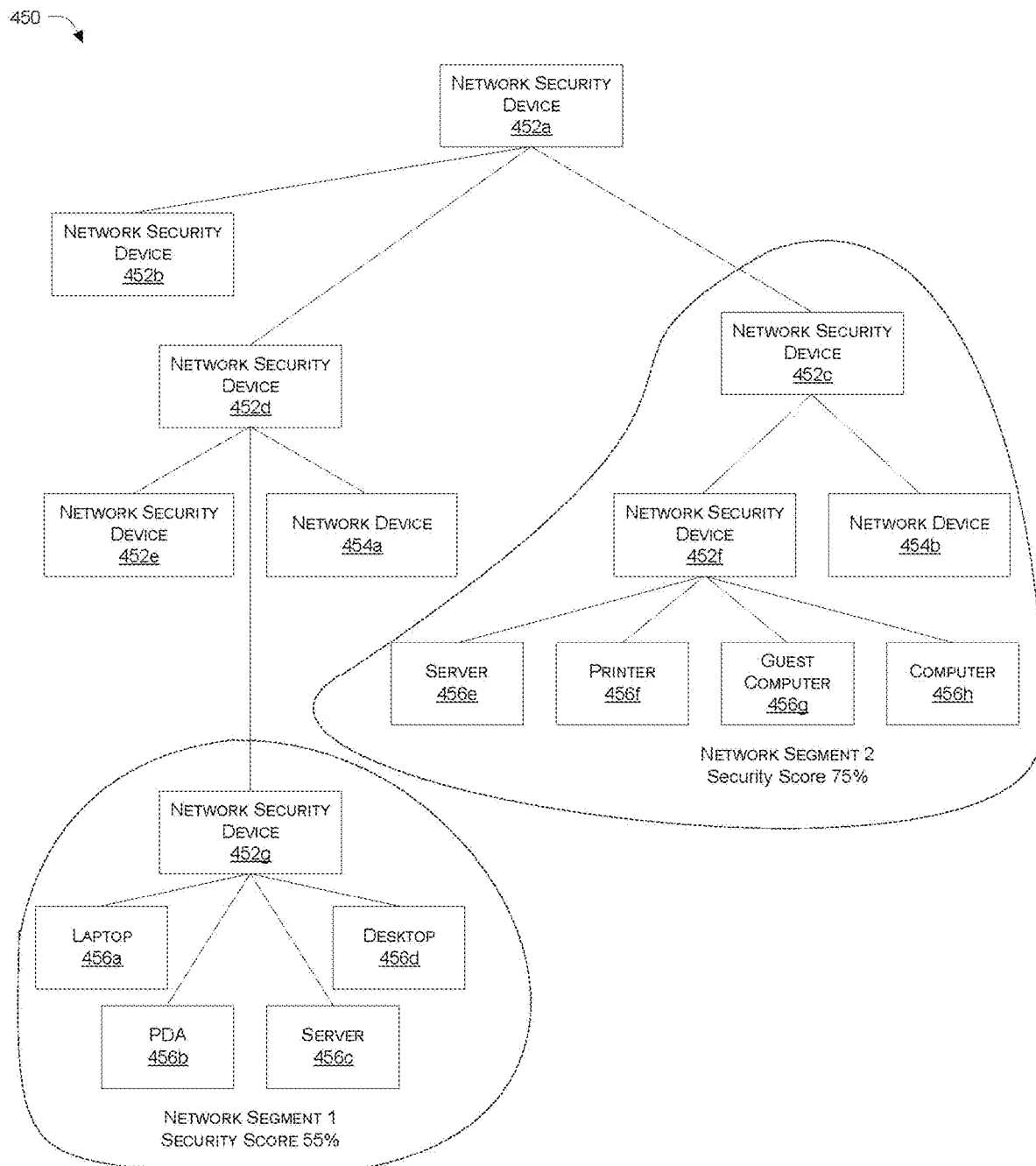
FIG. 4B illustrates exemplary network segments of a network having different security scores determined in accordance with an embodiment of the present invention.

FIG. 4B illustrates exemplary network segments of a private network 450 having different security scores determined in accordance with an embodiment of the present invention. For each network segment within private network 450, such as network segment 1 and network segment 2, a security score can be determined. For example, the security score for network segment 1 is 55% and security score for network segment 2 is 75%. These scores can be represented in a form of a percentage of security criteria met against the defined set of security criteria for the network segments. In an embodiment, the security score or scoring metric for each of the network segments of the private network can be graphically be represented. The network topology, including the interconnections among the network devices and logically formed network segments along with the generated scoring metrics or security scores can be graphically represented. As shown in FIG. 4B, private network 450 may have several network security devices, such as network security device 1 452a, network security device 452b, network security device 452c, network security device 452d, network security device 452e, network security device 452f and network security device 452g. Each of these network security devices 452a-g can be connected to different network devices 454a-h, also referred interchangeably as network nodes. The interconnections and hierarchical association of these network security devices can be analyzed to understand the network topology. As those skilled in the art will appreciate, a network segment can be defined by a network administrator or can be represented by physical and/or virtual partitioning of the network. For each network segment, a scoring metric and/or security score can be generated.

Figure 5:
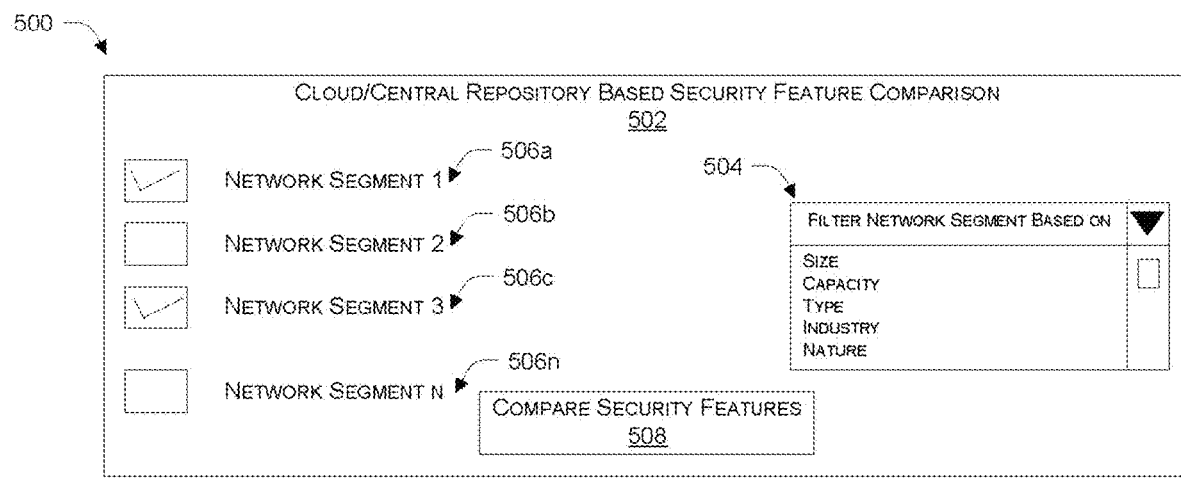
FIG. 5 illustrates an exemplary interface that allows sharing of security scores and comparison of security features of different networks using a cloud based platform in accordance with an embodiment of the present invention.

FIG. 5 illustrates an exemplary interface 500 that allows sharing of security scores and comparison of security features of different network segments using a cloud based platform in accordance with an embodiment of the present invention. In some embodiments, scoring metrics or security features of different network segments can be compared in general to network segments of third parties participating in the sharing community or compared to a filtered set of network segments based on various selected parameters. An interactive user interface can be provided for selecting two or more network segments and based on the selection of two or more network segment security feature comparison results can be displayed. In an embodiment, the scoring metric generated by system 200 can be shared anonymously to a cloud service and be compared to general scoring metrics anonymously shared by third parties or to a filtered set of scoring metrics anonymously shared by third parties. As shown in FIG. 5, a cloud/central repository based security feature comparison tool 502 can enable a user to select two or more network segments from a list of network segments 506a-n. These network segments can relate to a single private network or can be network segments of different private networks. In an embodiment, one or more filter parameters 504, such as size, capacity, type, industry and nature of network can be used to filter and retrieve network segments for making the comparison. After selecting the two or more network segments user or administrator can click the compare security feature 509 button. An interactive user interface can display the scoring metric in comparative form for all the selected network segments. The system can also highlight the feature or network device causing a low security score for the local network segment. A network device or network security feature causing a low security score can be highlighted and a recommendation can be made to improve the overall network security score. In a similar manner, different scoring metrics, each generated for a respective network segment can also be used to make the comparison.

Figure 6:
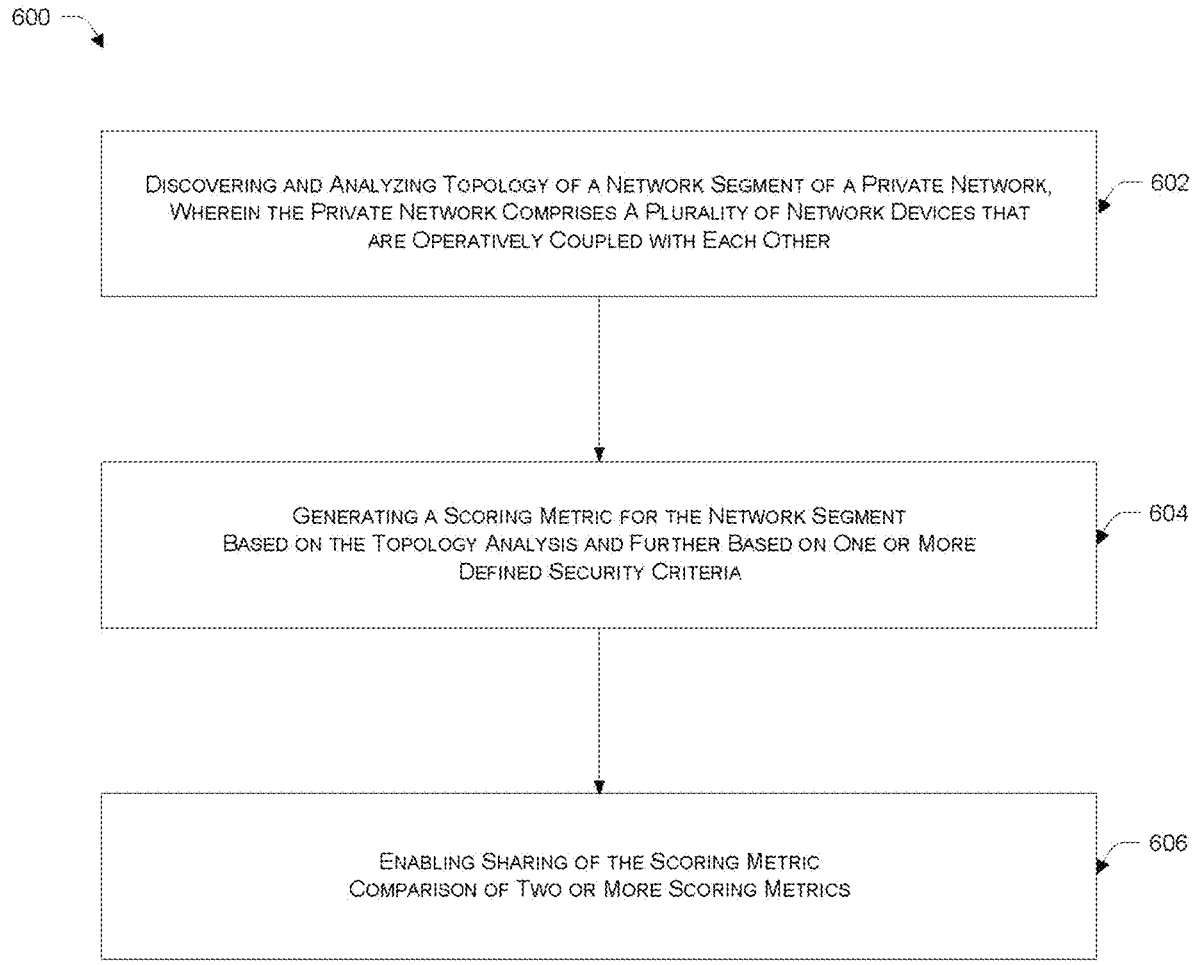
FIG. 6 is a flow diagram illustrating a method for generating and sharing of network security framework based scoring metrics in accordance with an embodiment of the present disclosure.

FIG. 6 is a flow diagram 600 illustrating a method for generating and sharing of network security framework based scoring metrics in accordance with an embodiment of the present invention. In an embodiment, the method for generating scoring metric and sharing the scoring metric includes steps of discovering and analysing topology of a network segment of a private network as shown at step 602, and generating a scoring metric for the network segment based on the topology analysis and further based on one or more defined security criteria as shown at step 604. In an embodiment, the private network comprises a plurality of network devices that are operatively coupled with each other.

The method further includes the step of enabling a user to create and associate for the network segment one or more security goals or select one or more security goals from a list of pre-configured security goals, based on which the one or defined security criteria are defined or selected.

In an embodiment, the method further includes the step of enabling sharing of the scoring metric to a community of participating third parties, and enabling comparison of two or more scoring metrics as shown at step 606.

In an embodiment, comparison between two or more scoring metrics (e.g., a local scoring metric and a general or aggregate average of a filtered set of scoring metrics from the community) can be performed based on filter parameters selected from any or a combination of the type of network, the type of network devices that form part of the network, geography, network topology, the type of company to which the network pertains, the industry to which the network pertains, the network density, the network size, and a network configuration attribute.

In an embodiment, one or more defined security criteria that can be used for generating scoring metric can be defined by the user or can be determined based on the one or more security goals associated with the network segment.

Figure 7A:
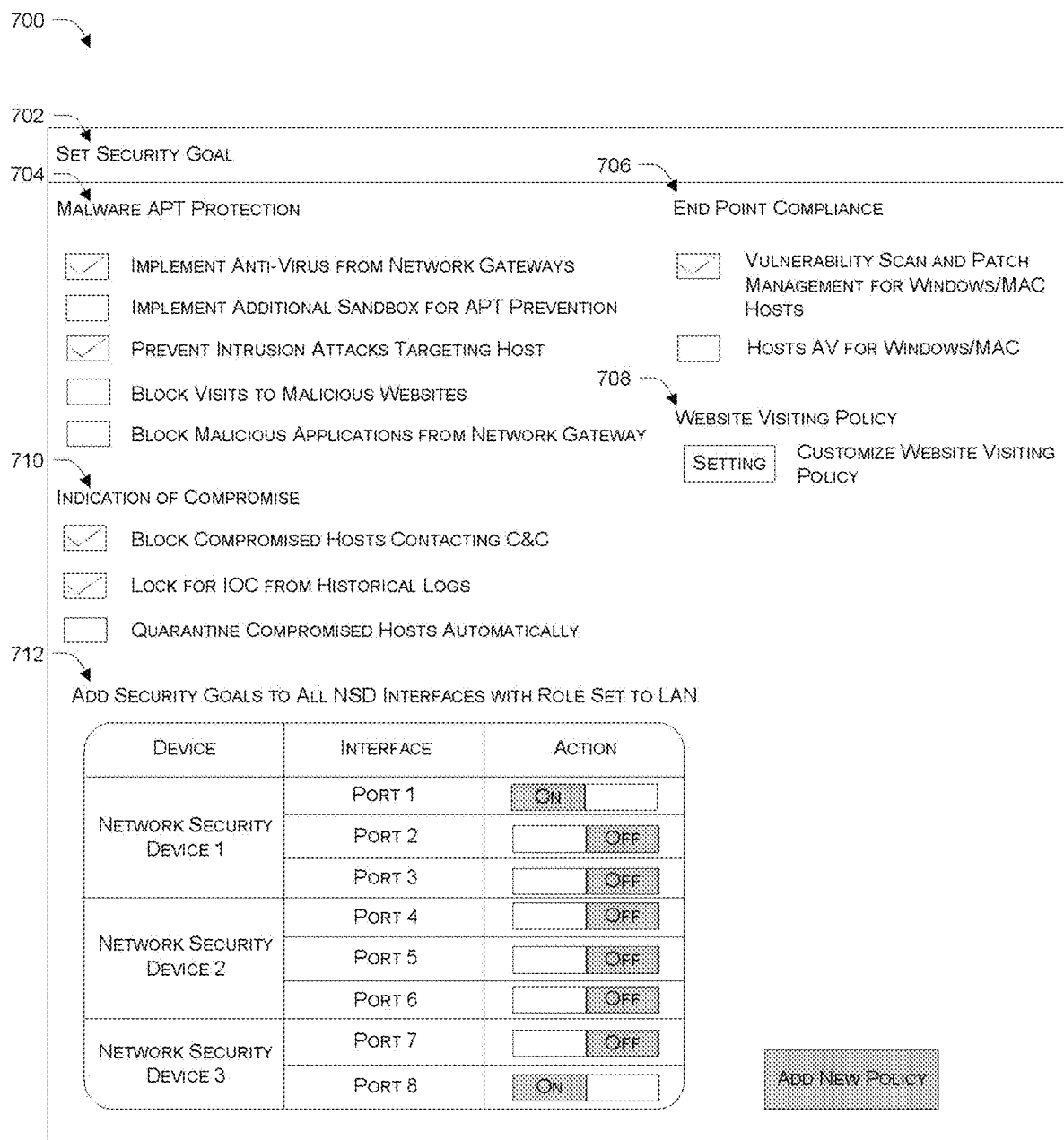
FIG. 7A depicts a user interface screen of a network security device illustrating exemplary security goals that can be set-up for a particular network or a part thereof for monitoring compliance in accordance with an embodiment of the present invention.

FIG. 7A depicts a user interface screen 700 of a network security device illustrating exemplary security goals that can be set-up for a particular network or a part thereof for determining a security score in accordance with an embodiment of the present invention. Illustrated here is an example user interface 700 with options to set a security goal 702. In an exemplary implementation, as shown in FIG. 7A, once a user selects a network or part thereof (which may be referred to herein interchangeably as a network segment), a list of security goals depending on the characteristics of the network or part thereof can be suggested. The user can either select any one or those recommended security goals and edit them as per the user's specific requirements or create a new security goal all together. As shown in FIG. 7A, the security goal can be "Malware APT protection" 704. The user can select from different options, for example, implement anti-virus from network gateways, prevent intrusion attacks targeting hosts etc. Security goals can be created for a network security device or end-user device (referred interchangeably as an end point). A user can select security goals that may be associated with end-point compliance 706 or with a network segment. For example, a security goal can be vulnerability scan and patch management for Windows/MAC hosts. Another exemplary security goal may relate to website visiting policy 708. Yet another example of a security goal can be related to indication of compromise 710. In an exemplary implementation, a user can apply different security goals for different interfaces, as shown by option 712. As those skilled in the art will appreciate, a security profile can include one or more security goals, wherein each security goals can include one or more security checks or security rules. One or more security criteria are required to be met in order for the network segment to be found to meet the security goals. In an embodiment, one or more security criteria can be associated with the security goals.

FIG. 7B depicts a user interface screen 750 of a network security device illustrating exemplary goal profiles that can be assigned to one or more network devices in accordance with an embodiment of the present invention. As shown in FIG. 7B goal profiles 752 can include a list of security goals to be applied to different network segments. Interface 750 lists profile names 756 for different network segments, for example LAN 758a and DMZ 758b. In an exemplary implementation, user can be presented with options to assign security goals to different interfaces of a network device. For example, for a gateway device (e.g., a FORTIGATE gateway device), the user can assign the security goals, as shown by option 760. Security profiles 766 can be defined independently for each device 762, and for each interface 764. As shown in FIG. 7B, different security goals can be created for different interfaces/ports of the same network security device.

Based on the created security goals, the system can analyze the network and report compliance with the security goals by a selected network segment. A scoring metric and/or a security score can be generated for the selected network segment. FIG. 8 depicts a compliance report 800 illustrating exemplary security loopholes and/or critical issues identified in accordance with an embodiment of the present invention. In an embodiment, compliance report 800 can include identification of interfaces, ports and network devices that are not configured in a manner to achieve an ideal score. As shown in FIG. 8, compliance report 400 can list network security device 802 that is non-complaint or causing a low security score for the network segment. Report 800 can also list interfaces, for example, LAN segment 804, that is non-compliant with one or more selected security goals. In an exemplary implementation, report 800 can specify/recommend preventive/corrective actions 806 to be taken to ensure compliance with the security goals and to improve the security score. As illustrated, report 800 can list unprotected hosts, along with their identification and IP addresses. Report 800 can also include a graphical representation of issues and positions of the network devices causing the issues. Report 800 can include various recommendations for performance improvement of the network. For example, report 800 can recommend, to meet the vulnerability scan and patch management goal, installation of a network security device for all hosts in the network. Similarly, for another segment, the system report can include another recommendation. For example, to meet the host anti-virus goal, it may be recommended that network security measures be installed on all host in the network. Report 800 can also include recommended changes to the configuration of the interfaces, ports, security policies and network arrangement to improve the overall security goal associated with the network segment.

FIG. 9A depicts a performance recommendation report 900 illustrating exemplary performance optimization recommendations in accordance with an embodiment of the present invention. Performance recommendation report 900 can include different performance recommendations 904 for different network security devices 902. For example, a performance recommendation for network security device 1, may indicate "we have detected continuous high CPU and memory usage on this network security device, i.e. CPU average usage of 91% over past 24 hours, and memory average usage of 95% and hence recommend to upgrade this node to a higher capacity network security device". Similarly, for network security device 2, the recommendation may indicate "we have detected that traffic logging volume across all network devices exceeds the recommended log rate for your network device, i.e. actual log rate over past 24 hours is 15,501 logs/sec, and recommended log rate for FAZ 1000D is 12000 logs/sec, and hence we recommend upgrading to a higher end network device or use of collector analyzer mode with multiple network device to distribute the log collection". Similar recommendations can be provided based on analysis of the network traffic to ensure that the security goals are met and the network or part of the network is running in compliance of the security goals. In some implementations, performance bottlenecks can be reported with a suggestion to upgrade the nodes or the channels causing the bottleneck.

FIG. 9B depicts a configuration recommendation report 950 illustrating exemplary configuration recommendations in accordance with an embodiment of the present invention. In some implementations, report 900 can include a configuration recommendation report 500. Configuration recommendation 502 cam include for each segment (for example, LAN segment 956) or network interface of network devices 954 separate recommendation summaries 958. The user or network administrator can accept the recommendation by taking the recommended action 960. As shown in FIG. 9B, for network security device 1, port 1, the recommendation may indicate "to meet the network antivirus goal, we recommend to setup anti-virus profiles on policies 1 and 14". Similarly, for network security device 2, port 1, the recommendation can state "to meet malicious website blocking goal, we recommend to setup an anti-virus profile on policies 1 and 14, for network security device 3, across all ports, the recommendation might be "to meet the network antivirus goals, we recommend activating the anti-virus service on network security device 1500D and network security Device 60D. Similarly, suitable recommendations can be made for different network security devices to address perceived gaps in security with respect to identified security goals. Based on the comparison of security goals with the network security policy being executed by different network devices of a network segment, the proposed system can identify security gaps and recommend certain actions to be taken in order to ensure compliance with the security goals.

As suggested above, all non-compliances can be reported based on the comparison. A graphical representation, indicating the types of security gaps, recommended actions to address the gaps, and location of the network device where the gaps exist can be provided. The administrator can browse through different network segments to see if that network segment complies with the set security goals. In an exemplary implementation, the system can also score each segment of the network and provide a comparison with similar network segments of the sane network or another network.

In some embodiment, the reasons why a segment is scoring high can be provided to a network admin so that he/she can take similar measures to improve the security of the network segment that he/she is managing.

Figure 10:
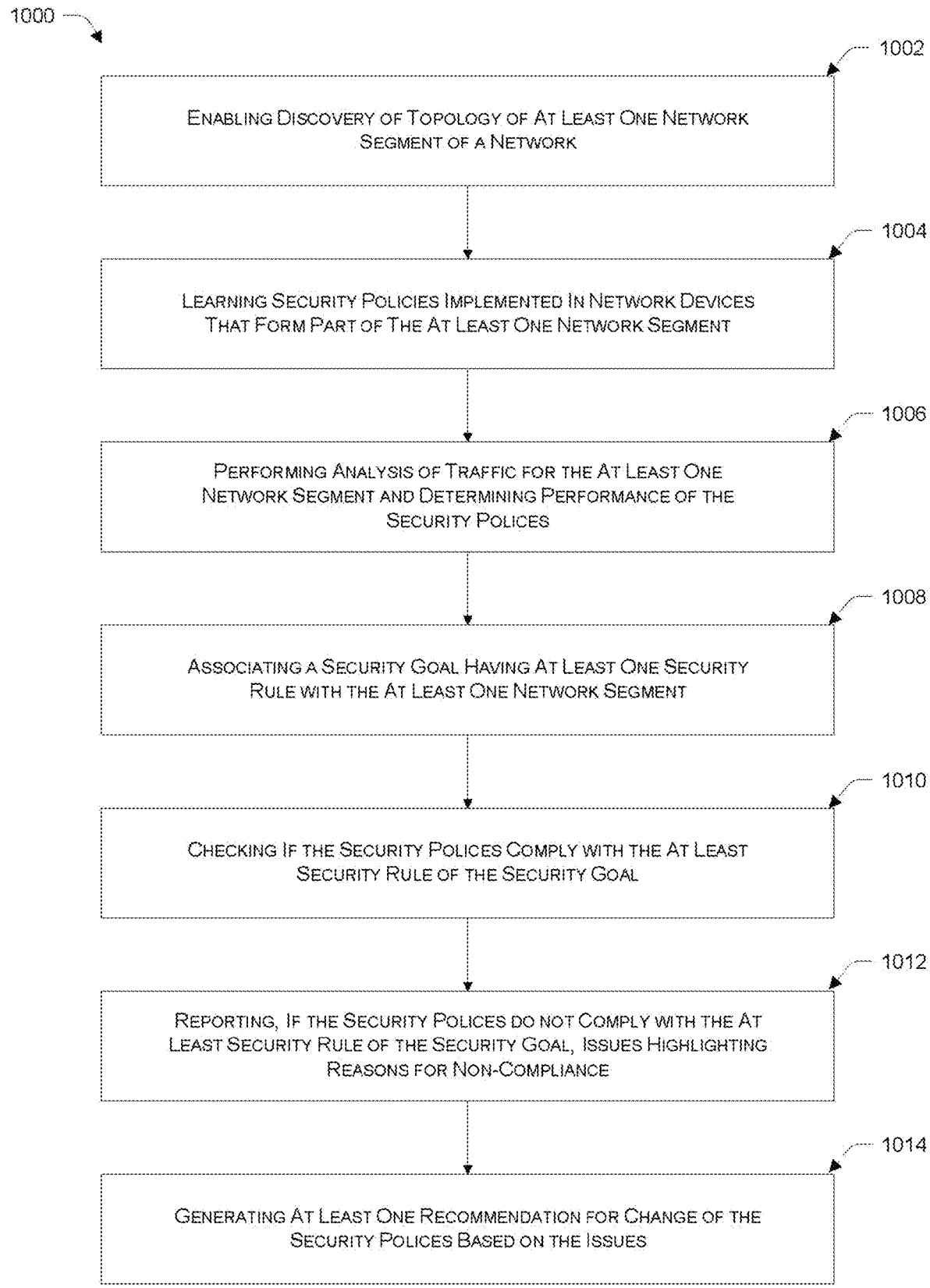
FIG. 10 is a flow diagram illustrating a method for monitoring compliance with security goals by a network or a part thereof in accordance with an embodiment of the present invention.

FIG. 10 is a flow diagram 1000 illustrating a method for monitoring compliance with security goals by a network or a part thereof in accordance with an embodiment of the present invention. As shown in FIG. 10, monitoring compliance with security goals by a network or a part thereof can include the step of enabling discovery of topology of at least one network segment of a network, as shown at step 1002, learning security policies implemented in network devices that form part of the at least one network segment, as shown at step 1004, performing analysis of traffic for the at least one network segment and determining performance of the security policies, as shown at step 1006, associating a security goal having at least one security rule with the at least one network segment as shown at step 1008, and checking if the security policies comply with the at least one security rule of the security goal, as shown at step 1010. The method can also include the steps of reporting issues, if the security policies do not comply with at least one security rule of the security goal, highlighting reasons for non-compliance as shown at step 1012. In an exemplary implementation, the method includes the steps of generating at-least one recommendation for making a change to the security policies based on the issues as reported, as shown at step 1014.

In some implementations, discovery of topology of a network segment of a network can be performed using a suitable network discovery protocol. A detailed network topology provides information regarding the types of devices, identities of the devices, where these devices are relative to each other, how they are connected, what functions they are performing, what security policies are being implemented on different network devices among other such details of the network and network devices. In a preferred implementation, a NST or a CFS can be constructed (as described below) to represent one or more network segments and/or the entire enterprise network. In some implementations, security policies configured at different network devices can also be learned during network discovery and the learning phase. To further understand the network and traffic flow, traffic logs as well as the live traffic can be analyzed and all the performance issues related to implementation of the security policies can be analyzed. Performance issues can include, but are not limited to, any bottlenecks, repetition of security policies by different network devices and other such issues associated with security policy execution.

In an exemplary implementation, for discovering network topology, for sharing intelligence in real-time and to get update on network traffic, network policies being implemented by network devices and other network activities across the network, a CSF can be built as described below. The CFS may span across an entire network, using network telemetry to link different security devices, security sensors and tools together to collect, coordinate, and respond to different network activities in real time.

Figure 11:
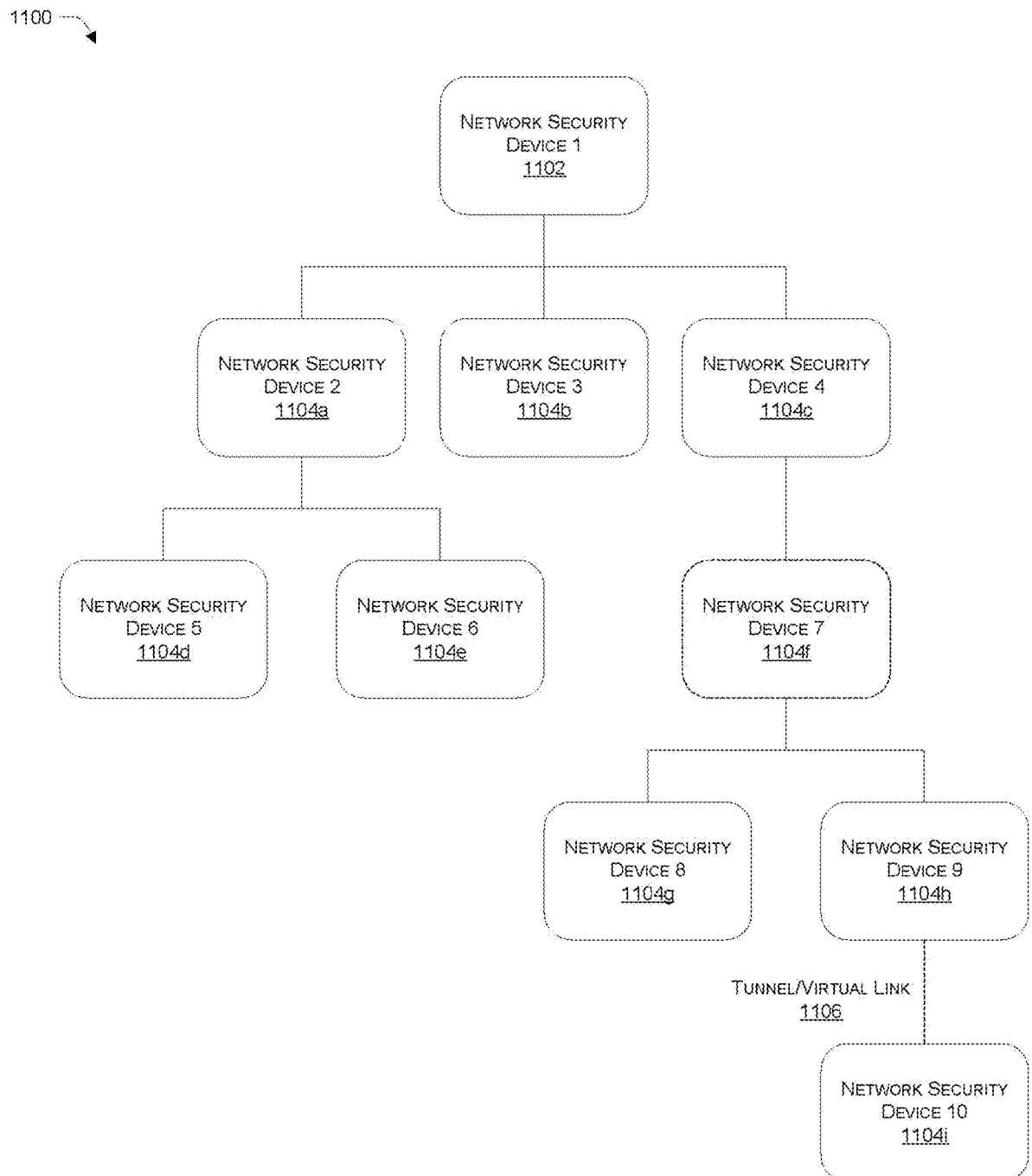
FIG. 11 illustrates an exemplary cooperative security fabric (CSF) created in accordance with an embodiment of the present invention.

FIG. 11 illustrates an exemplary cooperative security fabric 1100 created in accordance with an embodiment of the present invention. In the simplified example illustrated by FIG. 11, CSF 1100 includes one root node network security device, which may also be referred to interchangeably as the master network security device or root node, multiple intermediate node NSDs (i.e., NSD 2 1104a, NSD 4 1104c, NSD 7 1104f, and NSD 9 1104h), and multiple leaf node NSDs (i.e., NSD 3 1104b, NSD 5 1104d, NSD 6 1104e, NSD 8 1104q, and NSD 10 1104i). Each intermediate node NDS of CSF 1100 may be aware of downstream network topology, along with being aware of its connected downstream network security devices, and its parent node. For instance, NSD 1102 would be aware of the entire network topology, whereas NSD 2 1104a would only be aware of its downstream nodes—NSD 5 1104d and NDS 6 1104e—and its parent, NDS 1 1102.

According to one embodiment, CSF 1100 can be dynamically constructed and maintained in a recursive way based on the downstream-upstream relationships defined by the hierarchical interconnection of the network security devices within the private network. For example, NSD 1 1102, having no parent, may initially represent a CSF containing only one member. The other NSDs 1104a-i, having one or more upstream NSDs, may join the CSF to which its parent belongs as described further below. Once CSF 1100 stabilizes, the root node, i.e., NSD 1 1102, has full information regarding CSF 1100.

As noted above, NSDs participating within CSF 1100 are permitted to issue queries to downstream NSDs participating within CSF 1100. As such, NSD 2 1104a may issue a query to either or both of NSD 5 1104d and NSD 6 1104e. In one embodiment, however, the CSF protocol precludes participating NSDs from issuing queries to upstream NSDs or NSDs that are not downstream from the NSD at issue. For example, in an embodiment in which such limitations are enforced by the CSF protocol, NSD 2 1104a would not be permitted to issue a query to any of NSD 1 1102, NSD 3 1104b, NSD 4 1104c, NSD 7 1104f, NSD 8 1104g, NSD 9 1104h and NSD 10 1104i.

As shown in FIG. 11, network security device 1 1102, being the root note of the CSF 1100, does not have a parent node and can be recognized as the master network security device within CSF 1100. Nodes within CSF 1100 can distinguish between being a leaf node and a root node in many ways, including whether they are directly coupled to more than one other node and whether they have a direct WAN connection. In addition to the permissible actions allowed to be performed by upstream network security devices (e.g., performing resource optimization for a downstream network security device and/or management of a downstream network security device), the master network security device has knowledge of the entire topology of the private network (not shown) within which CSF 1100 is formed.

In an exemplary implementation, CSF 1100 can be built in such a manner that each node of CSF 1100 can request information regarding its downstream nodes and can send a query that may include an address of the destination node, a path to be followed from the source node (i.e., the node from which the query is originated) to the destination node, and query data. As those skilled in the art will appreciate, by making CSF 1100, the root node, NSD 1102, in the present example, becomes the master NSD and the other nodes in CSF 1100 are fully aware of their respective downstream NSDs connected with them as well as their respective parent nodes. Each intermediate node NSD of the NST 1100 may be aware of its parent NSD and child NSD(s). In the context of the present example, NSD 7 1104 would be aware of its parent NSD 4 1104c, and of its children NSD 8 1104g and NSD 9 1104h. In CSF 1100, each node, except the root node NSD 1102 and leaf nodes (i.e., NSDs 1104d, 1104e, 1104b, 1104g, and 1104i), has one upstream node and one or more downstream nodes/NSDs. For instance, from the perspective of NSD 1104a, NSD 1102 represents an upstream node, and 1104d and 1104e represent downstream NSD nodes.

Each node of CSF 1100 can be configured to be only aware of the nodes/NSDs directly connected with it. As those skilled in the art will appreciate, CSF 1100 made in accordance with an embodiment of the present invention does not require election of a master NSD as the nodes/NSDs within CSF 1100 that have a parent/upstream device recognize they are not the head/root/master of CSF 1100 and the one node/NSD within CSF 1100 that does not have a parent/upstream device recognizes itself as the head/root/master of CSF 1100.

In an exemplary implementation, each node of CSF 1100 may include one or more daemons, including a backend daemon and a forward daemon. In an exemplary implementation, the backend daemon running within a particular NSD can establish/create bidirectional tunnels between (i) the particular NSD and its parent, if any; and (ii) the particular NSD and each of its child nodes, if any. Further details regarding tunnel creation are described below with reference to FIG. 10. Each bidirectional tunnel can be configured to allow an upstream node/NSD to query a downstream node/NSD that it is connected to through the tunnel. Such a tunnel, in one exemplary configuration, can restrict the downstream node/NSD from sending queries to its upstream node/NSD. In general, when an upstream NSD queries a downstream NSD, the query is passed from the forward daemon of the upstream NSD (which may be referred to herein as an "up-level daemon") to the backend daemon of an intermediate NSD, if any, (which may be referred to herein as a "down-level daemon") and ultimately to the destination NSD. When the query reaches the destination NDS, the query is processed by the local backend daemon of the destination NSD. In this manner, queries may propagate downward toward the destination NSD in a recursive manner passing through the various intermediate up-level and down-level daemons as described further below. Similarly, responses to queries may propagate upward toward the originating NSD in a recursive manner passing through various intermediate down-level and up-level daemons.

For purposes of illustration, when node 1104c queries node 1104h, a first tunnel that has been created between node 1104c and node 1104f is initially used to pass the query from the forward daemon of node 1104c to the backend daemon of node 1104f. Then, the query is further passed from the forward daemon of NSD 1104f to the backend daemon of NSD 1104h via the tunnel established between NSD 1104f and NSD 1104h. Finally, at the destination (i.e., node 1104f), the query is handled by local backend daemon.

In alternative embodiments, the communication channel between directly connected NSD can be implemented as two separate unidirectional tunnels, one for issuing commands, queries and/or keep-alive messages from an upstream node to a downstream node and one for returning responses to such commands, queries and/or keep-alive messages. Furthermore, while in the examples described herein, queries are described as flowing in a downstream direction, in some embodiments, downstream nodes may be allowed to query or update upstream nodes in one or more defined circumstances. For example, in one embodiment, responsive to accepting a join request from a new NSD, the NSD that has integrated the new NSD into its subtree may provide a topology update regarding its subtree to its parent via the tunnel connecting the two. In one embodiment, this topology update may be propagated all the way to the root of CSF 1100.

In an exemplary implementation, the backend daemon running within each node of CSF 1100 can be configured to create a tunnel or virtual link, for example, tunnel 1106, between the upstream and downstream devices and handle one or more exceptions, if any. Backend daemon may also provide an Application Programming Interface (API), for example a Representational State Transfer (REST) or RESTful API, to the up-level daemon to enable queries to be received and processed by the backend daemon. In an exemplary implementation, each node of CSF 1100 may have a forward daemon that is configured to enable query initiation and response processing. The forward daemon can initiate a query, which may include a destination address, a complete path from the source node to the destination node, for example, indicating the addresses of all intermediate nodes through which the query is to pass, and query data. As described in further detail with reference to FIG. 9, each intermediate node, upon receiving a query, identifies whether the query is destined to it and, if so, can accordingly process the query; otherwise, the intermediate node can forward the query towards the destination node based on the path defined in the query.

The bidirectional tunnels represented by the connections between the nodes in CSF 1100 may be established during construction of CSF 1100. Alternatively, they may be established on demand. In an exemplary implementation, when a query is initiated by an up-level daemon, the backend daemon of the source NSD can create the required tunnel between the source NSD and the next NSD, and similarly subsequent required tunnels can be created by other intermediate NSD(s) between themselves and their direct downstream NSD. When a query arrives at the destination node, backend daemon of the destination node can send the query by making an appropriate call via the local RESTful API and wait for the response. The destination NSD can then generate a response, which can be proxied back to each upstream device until it reaches the source NSD. As those skilled in the art will appreciate, no path is required for a response as each node of CSF 1100 can only have one parent. As such, a response can simply be propagated upstream until it reaches the source NSD that issued the corresponding query. An exemplary set of REST APIs is described in the attached Appendix.

In an exemplary implementation, for a given tree such as CSF 1100, a group name and password associated with CSF 1100 can be used to allow a new NSD to join CSF 1100 and authenticate itself to its parent. In order to join CSF 1100, a new NSD may send a join request, including the group name and password to the Internet Protocol (IP) address of its parent. Responsive to receipt of the join request, the parent NSD verifies the group name and password, and upon successful verification, the backend daemon of the parent NSD may establish a bidirectional tunnel with the new NSD and update the subtree rooted at itself to include the new NSD. As described further below, the tunnel is used for periodic keep-alive messages between parent and child and for on-demand query messages from parent to child.

In one embodiment, rather than reporting a topology change upward through CSF 100 responsive to acceptance of a join request, upstream NSDs can request topology information associated with the subtree of a downstream NSD on demand, for example, responsive to a network administrator requesting a refresh of a graphical user interface presented by the root NSD. For instance, with respect to FIG. 7, a new NSD (not shown) can send a join request to become a part of CSF 1100 to NSD 1104b, which upon, authentication and verification, can add the new NSD as its child node. Later, responsive to a query by NSD 1 1102 requesting topology information, NSD 3 1104b can provide topology information regarding its subtree. Alternatively, information about integration of a new NSD can be passed up to a root node NSD, which can then broadcast the information to other NSDs participating in CSF 1100.

In an exemplary implementation, root node NSD, for example NSD 1102 of NST 1100, can information regarding the entire topology of CSF 1100 by sending a query requesting topology information regarding the subtrees of each of its children. Upstream NSDs can be aware of the identity of each NSD, its type, capabilities, resources etc. and tunnel/virtual links. Identity of each NSD, its type, capabilities, resources etc. and the tunnel/virtual links created between the NSDs can be transparent.

Figure 12:
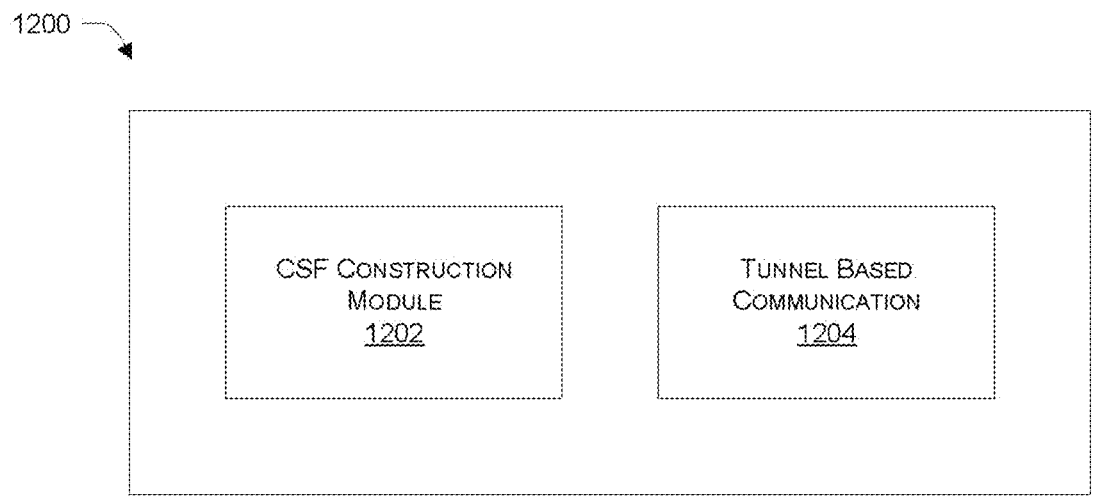
FIG. 12 illustrates exemplary functional modules of a network security device for dynamically forming a cooperative security fabric in accordance with an embodiment of the present invention.

FIG. 12 illustrates exemplary functional modules of a network security device (NSD) 1200 for dynamically forming a CSF in accordance with an embodiment of the present invention. In this simplified example, NSD 1200 may include a CSF construction module 1202 and a tunnel based communication module 1204, which together can be used by NSD 1200 be used for dynamically forming a CSF (e.g., CSF 1100) that can enable each NSD forming part of the CSF to be aware of the network topology of its downstream devices and enable resource optimization (e.g., firewall policy optimization and/or logging optimization) of downstream NSDs. Depending upon the particular implementation, NSD 1200 may represent a gateway device, a firewall device, an Intrusion Detection System (IDS), an Intrusion Prevention Systems (IPS) and/or a Unified Threat Management (UTM) device.

Collectively, CSF construction module 1202 of each of the NSDs within a private network dynamically constructs a CSF based on the hierarchical interconnections among them by determining its relative position as a root, intermediate or leaf node. As noted above, NSDs may send join requests to their parents to join the CSF in which their parents are participating. While the examples described herein may be described with reference to a single CSF within a private network, it is contemplated that network security devices may be divided into multiple CSFs and may participate in a single CSF or multiple CSFs.

Tunnel based communication module 1204 establishes tunnels between NSD 1200 and its parent, if any, and each of its children, if any. Tunnel based communication module 1204 also enables communication of periodic keep-alive messages and on-demand query messages among parent nodes and their respective child nodes. As noted above, the tunnels may be established by a backend daemon (now shown) running on NSD 1200 and NSD 1200 may issue queries or commands to down-level daemons via a forward daemon (not shown) running on NSD 1200.

In an aspect, CSF construction module 1202 can be configured to dynamically construct a CSF based on hierarchical interconnections among multiple network security devices deployed within a protected network. In another aspect, the CSF can be constructed by determining relative positions of each network security device within the CSF based on at least one identifier, such as an IP address, a type of NSD, the serial number of the NSD, a manufacturing year/date/time of the NSD, functionality of the NSD, location/position/configuration of the NSD in the network, importance of the NSD in the network, among other like parameters. Each network security device, except root node network security device and leaf-node network security devices, can be configured to have a single parent node and one or more child nodes, and each NSD of the CSF can be constrained to allow queries to be issued only in the downstream direction.

In an exemplary implementation, the at least one identifier that is associated with each NSD can be the IP address, type of NSD, hierarchy of NSD with respect to each other or with respect to OSI model, configuration/serial number/location of the NSD, among any other identifier attribute of the NSD.

In an aspect, tunnel based communication module 1204 can be configured to establish, by a backend daemon running on NSD 1200, a tunnel between a directly connected upstream network security device (not shown), if any, and each directly connected downstream NSD (not shown), if any.

Communication module 1204 can further be configured to enable communication of periodic keep-alive messages and on-demand query messages among the upstream network security device and the one or more downstream network security devices of the particular node. In an exemplary implementation, each network security device participating in the CSF can be configured to be aware of only those of the network security devices that are directly connected to it. By limiting the awareness of the NSD devices in the CSF, better efficiency in term of network routing, security, and management can be achieved.

In another aspect, the proposed CSF forming system can configure each NSD node in such a way that one or more downstream network security devices of a particular NSD of the NST cannot query the particular NSD (which is the upstream network security device for the downstream NSDs). The system can therefore configure each NSD so as to restrict an upstream NSD from being queried by a NSD that is lower in the CSF hierarchy.

In an exemplary implementation, the root node NSD can be aware of complete topology of the NST by means of one or more local daemons configured within each NSD. The root node NSD does not have any upstream NSD attached therewith, and similarly, leaf node NSDs do not have any downstream NSDs attached thereto. The root node NSD can act as master NSD, and can perform various network management and resource optimization functions in the network or in the CSF.

Figure 13:
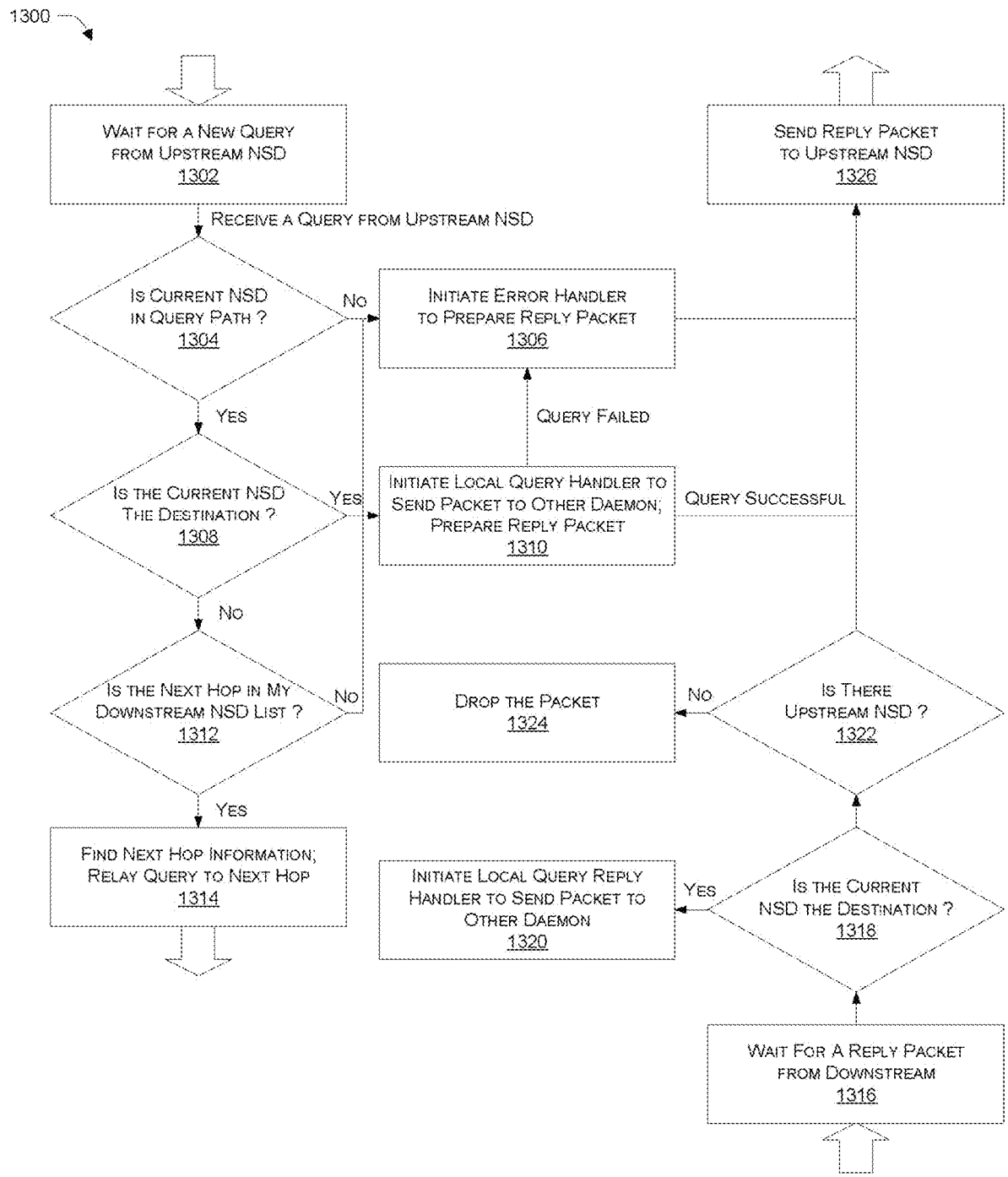
FIG. 13 is a flow diagram illustrating query handling by a network security device in accordance with an embodiment of the present invention.

FIG. 13 illustrates an exemplary flow of query handling by an NSD of a CSF in accordance with an embodiment of the present invention. According to one embodiment, each NSD implements two separate daemons—one, the forward daemon, which, among other things, issues queries to downstream NSDs and receives and routes responses to queries received from downstream NSDs, and another, the backend daemon, which, among other things, receives and processes queries from upstream NSDs (via a RESTful API, for example). In an exemplary implementation, each NSD can be configured to handle query and response packets based on the content of the respective packet and the specified query or return path. In an exemplary implementation, the response packet can include the destination address (which is the same as the source address of query packet), a return path including addresses of intermediate node(s)/hop(s)/NSD(s) through which it needs to be routed, along with the response data. In an exemplary implementation, return path and the query path can be same or different. In an exemplary implementation, communication between upstream and downstream NSDs can be enabled through a tunnel created by the current NSD.

As shown in FIG. 13, a particular NSD can wait for a new query from an upstream NSD, as shown at block 1302. When the particular NSD receives the query that has a defined query path indicating the identities of intermediate NSDs, the destination NSD(s), and query data, it can check whether the current/particular NSD is in the query path, as shown at decision block 1304. When the particular NSD is in the query path, it can further determine whether the current NSD is the destination NSD, as shown at decision block 1308.

When the particular NSD is not in the query path, an error handler can prepare a reply packet, as shown at block 1306, and send the reply packet to the upstream NSD as shown at block step 1326.

When the current NSD is the destination NSD, a local query handler can be instantiated to handle the query and to cause the local forward daemon to prepare and send the reply packet upstream to the originator of the query as shown at block 1310, wherein the forward daemon can send the reply packet to the upstream NSD, as shown at block 1326. When the current NSD determines that it is not the destination NSD, it can determine whether the next hop NSD in the query path is in its downstream NSD list, as shown at decision block step 1312. When the current NSD determines that the next hop is in its downstream NSD list, it can find the next hop information and relay the query to the next hop/downstream NSD as shown at block 1314; otherwise, an error handler is initiated to prepare a reply packet to be sent back to the upstream NSD as shown at block 1306.

In an exemplary implementation, the current NSD can also be configured to process response/reply packets received from a downstream NSD and make forwarding decisions to forward the responses/replies to an upstream NSD. As shown at block 1316, the current NSD can wait for a reply packet to be received from a downstream NSD connected to it, determine whether the current NSD is the destination NSD for the received response, as shown at decision block 1318. When the current NSD is the destination NSD, a local query reply hander can be initiated to send the packet to the other daemon—the up-level daemon—that is responsible for taking an appropriate action as shown at block 1320; otherwise, the current NSD can determine whether there is an upstream NSD connected with the current NSD as shown at decision block 1322. When the current NSD does not have an upstream NSD connected thereto, it can drop the response packet as shown at block 1324; otherwise, it can send the response/reply packet to the upstream NSD as shown at block 1326.

Figure 14:
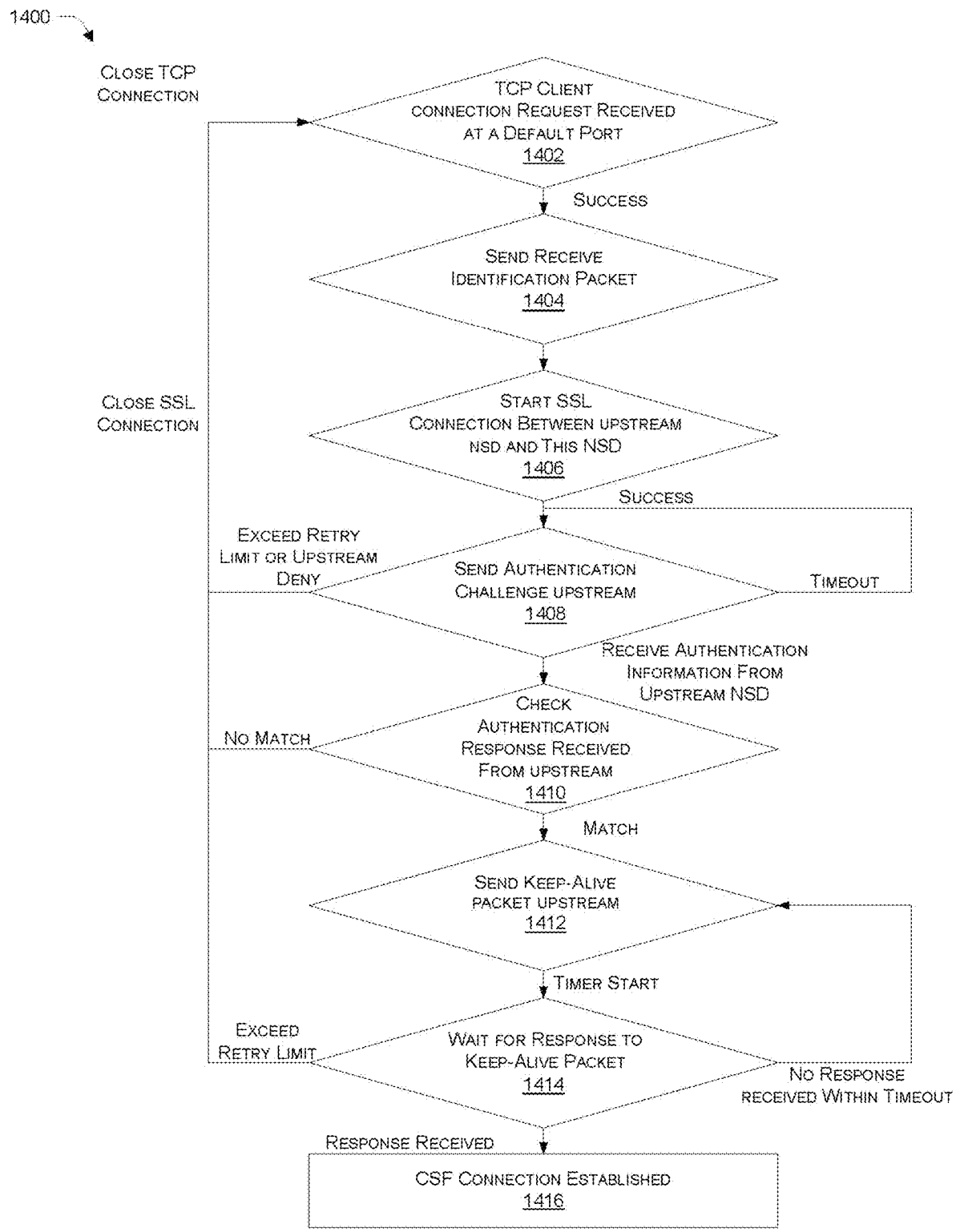
FIG. 14 is a flow diagram illustrating a downstream view of tunnel creation between two network security devices by a backend daemon in accordance with an embodiment of the present invention.

FIG. 14 illustrates an exemplary downstream view of tunnel creation between two NSDs by a backend daemon in accordance with an embodiment of the present invention. As shown in FIG. 14, an NSD can be configured to listen for a Transmission Control Protocol (TCP) client connection request on a default port, for example port 14013, as shown at decision block 1402, and send a service identification packet, as shown at block 1404. In an exemplary implementation, the TCP client connection request may be generated by the up-level daemon of the NSD or by a stream NSD. On successful identification of the service and compatibility of the network, the NSD can start a Secure Sockets Layer (SSL) client connection, as shown at block 1406 between the NSD and the TCP client, which can be a new NSD or an upstream NSD. The NSD can send an authentication challenge to the TCP client, and wait for the TCP client to provide authentication details (for instance, including a group name for the CSF and a corresponding password), as shown at block 1408. If the TCP client does not respond to the authentication challenge within a predefined timeout period associated with the authentication challenge, a timeout can occur and the NSD can resend the authentication challenge to the TCP client. When the NSD does not receive a response or the authentication response is not accurate after the retry limit has been exceeded, the NSD can close the SSL connection between the TCP client and the NSD and close the TCP connection request. When the authentication response is received from the client device, the NSD can check authentication information received from the client device to verify authenticity of the client device, as shown at decision block 1410. When the authentication information matches with the authentication credentials of the CSF of which the NSD is a part, the NSD can send keep-alive packet to the client device as shown at step 1412, and wait for acknowledgement of the keep alive packet from the client device (upstream NSD) as shown at decision block 1414. Upon receiving acknowledgement of the keep-alive packet, the CSF connection between the client device (the upstream NSD) and the current NSD can be established, as shown at block 1416.

Figure 15:
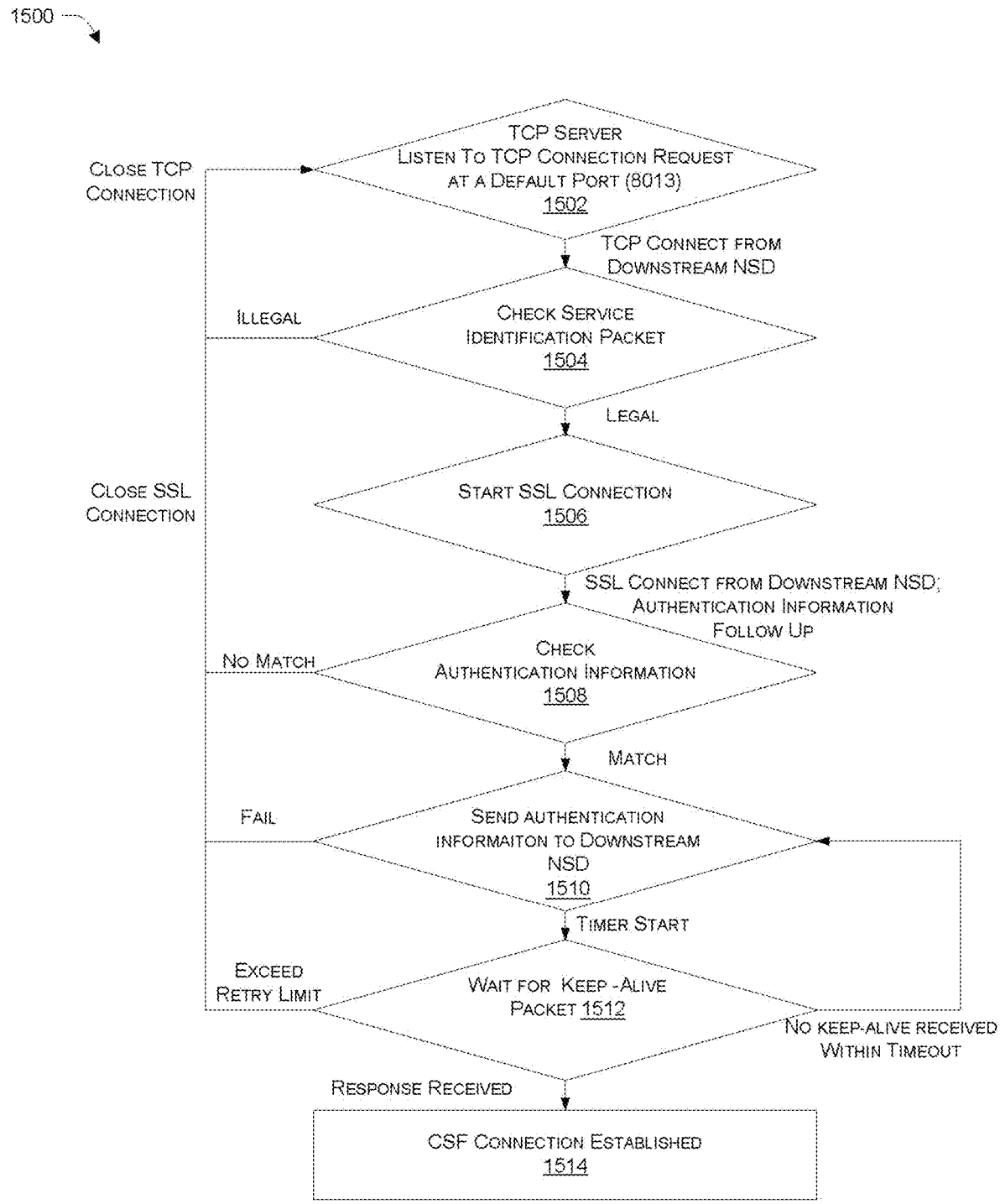
FIG. 15 is a flow diagram illustrating an upstream view of tunnel creation between two NSDs in accordance with an embodiment of the present invention.

FIG. 15 illustrates an exemplary upstream view of tunnel creation between two NSDs in accordance with an embodiment of the present invention. As shown in FIG. 15, a TCP server, for example an NSD can be configured to listen to a TCP connection request from a downstream NSD, on a default port, for example port 8013, as shown block 1502. Upon receiving the connection request from the downstream NSD, the NSD can check service identification packet, as shown at block 1504, and if the server identification packet is legal, the NSD can start an SSL connection between the downstream NSD and the NSD as shown at block 1506. When the service identification packet is illegal, the connection can be closed by the NSD. After starting the SSL connection, the NSD can check if the authentication information received from the downstream NSD matches with the CSF authentication credentials. In an exemplary implementation, if the authentication information provided by the downstream NSD matches with the CSF authentication credentials, the NSD can send its authentication information to the downstream NSD as shown at block 1510, and wait for a keep-alive packet, as shown at decision block 1512. In an exemplary implementation, the NSD can close the SSL connection and terminate the connection request when a keep-alive packet is not received within a predefined or configurable retry limit. On receiving the keep-alive packet, the NSD can confirm the tunnel as show at block 1514.

Figure 16:
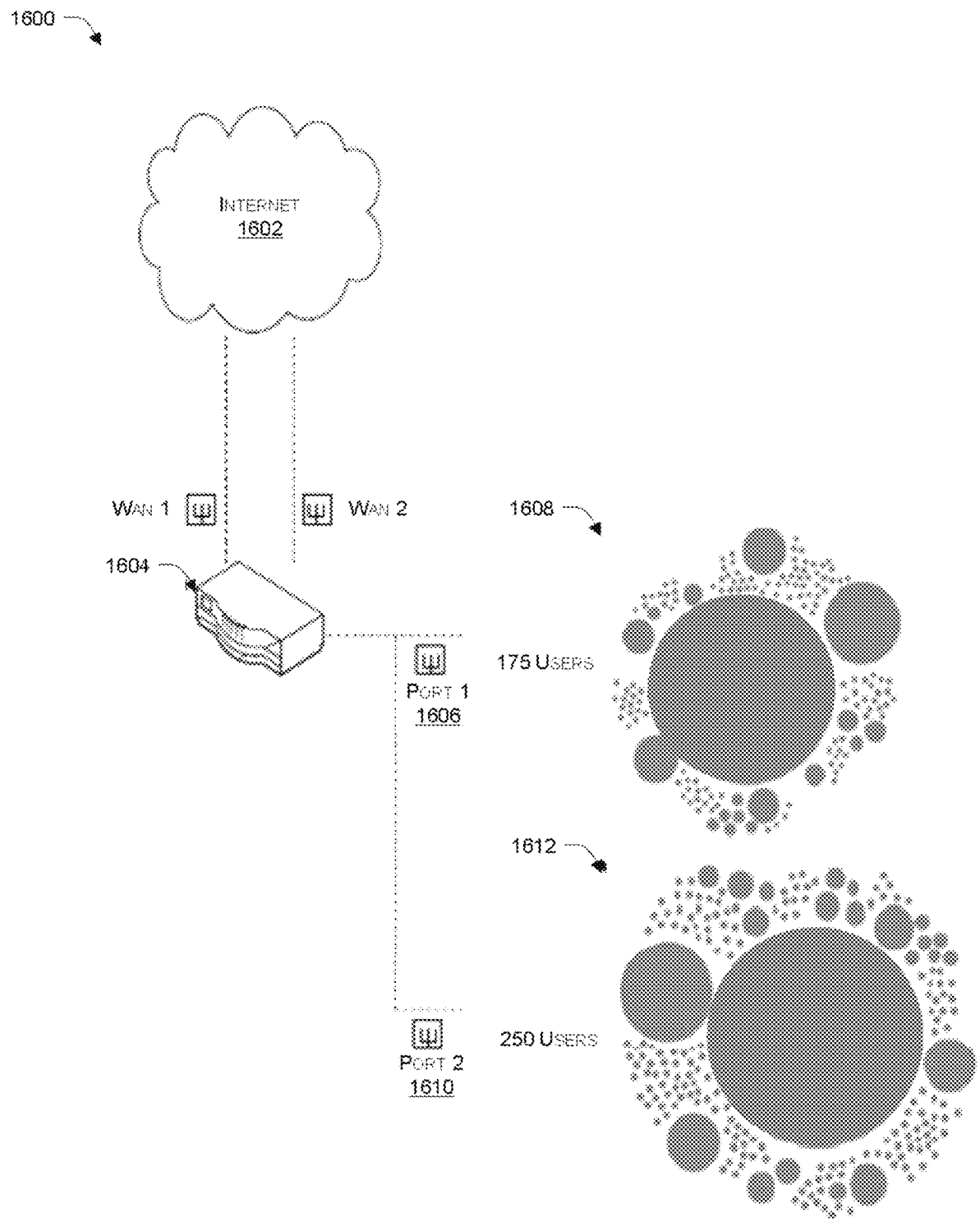
FIG. 16 illustrates a visual representation of NSDs associated with a private network arranged as a CSF in accordance with an embodiment of the present invention.

FIG. 16 illustrates an exemplary visual representation of a plurality of NSDs on a network that is arranged as a CSF in accordance with an embodiment of the present invention. System 1600 can be used for creating the CSF, which can be visually represented as shown in FIG. 16. The CSF created by the proposed CSF construction system can be used for accurately representing the connected NSDs and other network devices within the network protected by NSD 1604, shown here as bubble dots. FIG. 16 shows an NSD 1604 being connected to Internet 1602 at one end, and with a plurality of other NSDs through its different ports such as port 1 1606 and port 2 1610. Each port may be communicatively coupled to a plurality of network devices. For example, port 1 1608 is shown connected to 175 distinct users through various intermediate network devices, and port 2 1610 connects to 250 distinct users through some other intermediate network devices. Using the proposed CSF construction system, as soon as a new network device gets connected with the NSD 1604, a new bubble can be created to present the new NSD and similarly when an NSD leaves the CSF, a bubble can be deleted. In an exemplary implementation, a CSF of a plurality of network devices can be created at different levels, for example at a LAN, WAN, MAN level or at a global level.

In an exemplary embodiment, system of the present disclosure can create the CSF and configure each participating NSD to query, configure, and/or perform resource optimization for downstream network devices and/or downstream NSDs.

Figure 17:
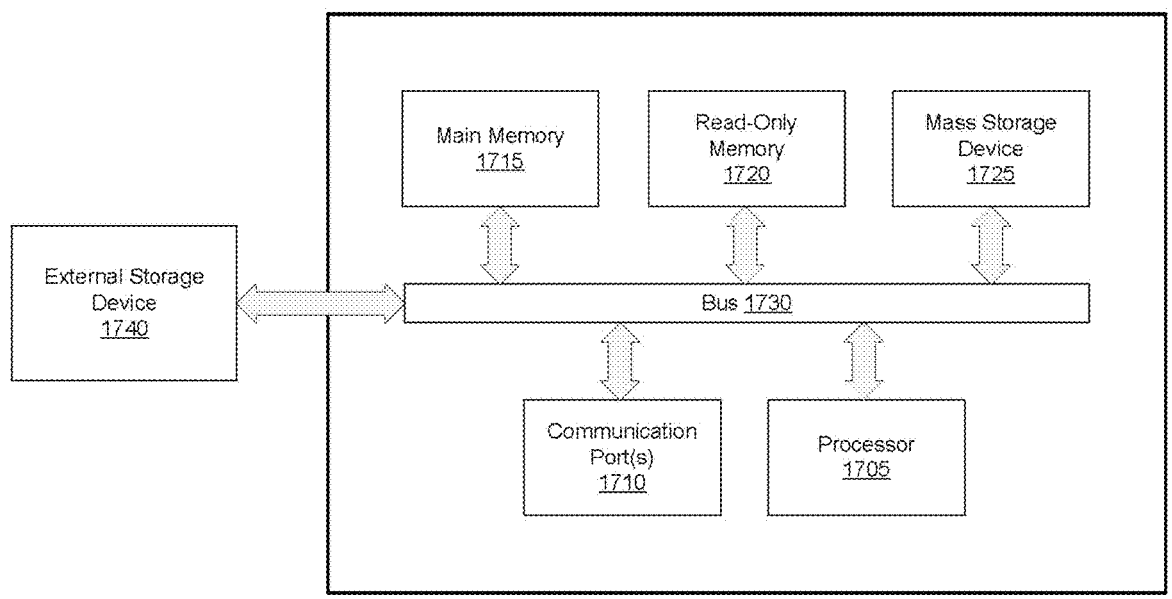
FIG. 17 illustrates an exemplary computer system in which or with which embodiments of the present invention may be utilized.

FIG. 17 is an example of a computer system 1700 with which embodiments of the present disclosure may be utilized. Computer system 1700 may represent or form a part of an NSD (e.g., NSD 1702, 1704*a-i*, etc). The computer system 1700 can be configured to implementation, system 200 and execute steps of method 600 as illustrated above.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1700 includes a bus 1730, a processor 1705, communication port 1710, a main memory 1715, a removable storage media 1740, a Read-Only Memory (RAM) 1720 and a mass storage 1725. A person skilled in the art will appreciate that computer system 1700 may include more than one processor and communication ports.

Examples of processor 1705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1705 may include various modules associated with embodiments of the present invention.

Communication port 1710 can be any of an RS-232 port for use with a modem based dialup connection, a 10/100 Ethernet port, a Gigabit or 10 Gigabit port using copper or fiber, a serial port, a parallel port, or other existing or future ports. Communication port 1710 may be chosen depending on a network, such a Local Area Network (LAN), Wide Area Network (WAN), or any network to which computer system 1700 connects.

Memory 1715 can be Random Access Memory (RAM), or any other dynamic storage device commonly known in the art. Read only memory 1720 can be any static storage device(s) such as, but not limited to, a Programmable Read Only Memory (PROM) chips for storing static information such as start-up or BIOS instructions for processor 1705.

Mass storage 1725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1730 communicatively couples processor(s) 1705 with the other memory, storage and communication blocks. Bus 1730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1705 to system memory.

Optionally, operator and administrative interfaces, such as a display, keyboard, and a cursor control device, may also be coupled to bus 1730 to support direct operator interaction with computer system 1700. Other operator and administrative interfaces can be provided through network connections connected through communication port 1710.

Removable storage media 1740 can be any kind of external hard-drives, floppy drives, IOMEGA® Zip Drives, Compact Disc-Read Only Memory (CD-ROM), Compact Disc Re-Writable (CD-RW), Digital Video Disk-Read Only Memory (DVD-ROM).

While embodiments of the present disclosure have been illustrated and described with reference to some FIGs and embodiments, it will be clear that the disclosure is not limited to these embodiments only. Numerous modifications, changes, variations, substitutions, and equivalents will be apparent to those skilled in the art, without departing from the spirit and scope of the disclosure, as described in the claims.

If the specification states a component or feature "may", "can", "could", or "might" be included or have a characteristic, that particular component or feature is not required to be included or have the characteristic.

What is claimed is:

1. A method comprising:
    participating, by a network security device of a plurality of network security devices of a private network of an enterprise, in a dynamic construction of a cooperative security fabric (CSF) interconnecting the plurality of network security devices in a form of a tree, wherein the tree has a plurality of nodes each representing one of the plurality of network security devices, and wherein the participating in the dynamic construction is based on information regarding hierarchical interconnections between the network security device and one or more directly connected upstream and downstream network security devices of the plurality of network security devices;
    receiving, by the network security device, information regarding one or more security goals for and to be associated with a network segment of the private network;
    identifying, by the network security device, a plurality of security criteria based on the one or more security goals;
    discovering, by the network security device, a topology of the network segment based on the CSF;
    learning, by the network security device, security policies implemented by one or more network security devices of the plurality of network security devices that form part of the network segment based on the CSF; and
    determining, by the network security device, a plurality of scores, including a score for each of the plurality of identified security criteria by:
        analyzing traffic passing through the network segment and observing behaviors of the one or more network security devices responsive thereto;
        analyzing respective system configurations of the one or more network security devices;
        parsing and evaluating the security policies; and
        evaluating performance of the security policies based on the traffic and the observed behaviors; and
    facilitating, by the network security device, understanding of an overall security posture of the network segment by a network administrator of the private network by generating a scoring metric representative of the overall security posture of the network segment based on the plurality of scores.

2. The method of claim 1, further comprising anonymously sharing, by the network security device, with a community of participating third parties the scoring metric, the plurality of scores, the plurality of identified security criteria, information regarding an industry with which the enterprise is associated, information regarding a geographic region with which the private network is associated and information regarding a size of the private network.

3. The method of claim 2, further comprising facilitating, by the network security device, comparison of the scoring metric to an average of scoring metrics for network segments of private networks reported by the participating third parties.

4. The method of claim 2, further comprising facilitating, by the network security device, comparison of the scoring metric to an average of scoring metrics for network segments of private networks reported by the participating third parties filtered by one or more of industry, geographic region and size of the private networks of reporting entities.

5. The method of claim 1, wherein each security criterion of the plurality of identified security criteria has a weight assigned thereto based on a relative importance of the security criterion to the overall security posture and wherein the plurality of scores take into consideration the respective assigned weights.

6. The method of claim 5, wherein each security criterion of the plurality of identified security criteria is categorized into a must-have category, a should-have category or a may-have category based on the relative importance of the security criterion to the overall security posture.

7. The method of claim 5, wherein the plurality of identified security criteria are selected from one or a combination of whether interfaces are labeled, whether network devices are labeled, whether the one or more network security devices have media access control (MAC) addresses of all connected devices, whether a demilitarized zone (DMZ) and a local area network (LAN) of the private network are mapped with each other, whether network devices of different types form part of the network segment, whether appropriate authentication policies are being used for administrator accounts, whether anti-virus and firewall functionality are enabled on the one or more network security devices, whether sessions are being logged, whether On-Net and Off-Net are enabled for defined network devices, whether post breach detection settings are enabled, whether sandboxing is available for submission of suspicious files, whether a wide area network (WAN) interface of the private network is monitoring and dropping BOTNET Internet Protocol (IP) addresses, whether malicious websites are being blocked for endpoints, whether spam and malicious email is being filtered, whether a web server associated with the private network is adequately protected against Distributed Denial of Service (DDoS) attacks, whether network device performance is being monitored, whether monitoring is taking place to ensure that the one or more network security devices are not exceeding their respective rated capacities, whether appropriate password policy is configured for each Dialup Virtual Private Network (VPN), whether 2-factor authentication is being mandated by the WAN interface for VPN connections, whether all endpoints associated with the network segment are being scanned for vulnerabilities, whether ANY interface is being used in specifying any of the security policies, whether a size of the network segment is smaller than a predefined threshold, and whether a peer-to-peer (P2P) protocol or application is running on the private network.

8. The method of claim 1, wherein each of the plurality of network security devices is selected from one or a combination of firewalls, intrusion prevention systems (IPSs), intrusion detection systems (IDSs) and Unified Threat Management (UTM) devices.

9. A non-transitory computer-readable storage medium embodying a set of instructions, which when executed by one or more processors of a network security device of a plurality of network security devices of a private network of an enterprise, cause the one or more processors to perform a method comprising:
   participating in a dynamic construction of a cooperative security fabric (CSF) interconnecting the plurality of network security devices in a form of a tree, wherein the tree has a plurality of nodes each representing one of the plurality of network security devices, and wherein the participating in the dynamic construction is based on information regarding hierarchical interconnections between the network security device and one or more directly connected upstream and downstream network security devices of the plurality of network security devices;
   receiving information regarding one or more security goals for and to be associated with a network segment of the private network;
   identifying a plurality of security criteria based on the one or more security goals;
   discovering, by the network security device, a topology of the network segment based on the CSF;
   learning security policies implemented by one or more network security devices of the plurality of network security devices that form part of the network segment based on the CSF; and
   determining, by the network security device, a plurality of scores, including a score for each of the plurality of identified security criteria by:
      analyzing traffic passing through the network segment and observing behaviors of the one or more network security devices responsive thereto;
      analyzing respective system configurations of the one or more network security devices;
      parsing and evaluating the security policies; and
      evaluating performance of the security policies based on the traffic and the observed behaviors; and
   facilitating understanding of an overall security posture of the network segment by a network administrator of the private network by generating a scoring metric representative of the overall security posture of the network segment based on the plurality of scores.

10. The non-transitory computer-readable storage medium of claim 9, wherein the method further comprises anonymously sharing with a community of participating third parties the scoring metric, the plurality of scores, the plurality of identified security criteria, information regarding an industry with which the enterprise is associated, information regarding a geographic region with which the private network is associated and information regarding a size of the private network.

11. The non-transitory computer-readable storage medium of claim 10, wherein the method further comprises facilitating comparison of the scoring metric to an average of scoring metrics for network segments of private networks reported by the participating third parties.

12. The non-transitory computer-readable storage medium of claim 10, wherein the method further comprises facilitating comparison of the scoring metric to an average of scoring metrics for network segments of private networks reported by the participating third parties filtered by one or more of industry, geographic region and size of the private networks of reporting entities.

13. The non-transitory computer-readable storage medium of claim 9, wherein each of the plurality of network security devices is selected from one or a combination of a firewall, an intrusion prevention system (IPS), an intrusion detection systems (IDS) and a Unified Threat Management (UTM) device.

14. The non-transitory computer-readable storage medium of claim 9, wherein each security criterion of the plurality of identified security criteria has a weight assigned thereto based on a relative importance of the security criterion to the overall security posture and wherein the plurality of scores take into consideration the respective assigned weights.

15. The non-transitory computer-readable storage medium of claim 14, wherein each security criterion of the plurality of identified security criteria is categorized into a must-have category, a should-have category or a may-have category based on the relative importance of the security criterion to the overall security posture.

16. The non-transitory computer-readable storage medium of claim 14, wherein the plurality of identified security criteria are selected from one or a combination of whether interfaces are labeled, whether network devices are labeled, whether the one or more network security devices have media access control (MAC) addresses of all connected devices, whether a demilitarized zone (DMZ) and a local area network (LAN) of the private network are mapped with each other, whether network devices of different types form part of the network segment, whether appropriate authentication policies are being used for administrator accounts, whether anti-virus and firewall functionality are enabled on the one or more network security devices, whether sessions are being logged, whether On-Net and Off-Net are enabled for defined network devices, whether post breach detection settings are enabled, whether sandboxing is available for submission of suspicious files, whether a wide area network (WAN) interface of the private network is monitoring and dropping BOTNET Internet Protocol (IP) addresses, whether malicious websites are being blocked for endpoints, whether spam and malicious email is being filtered, whether a web server associated with the private network is adequately protected against Distributed Denial of Service (DDoS) attacks, whether network device performance is being monitored, whether monitoring is taking place to ensure that the one or more network security devices are not exceeding their respective rated capacities, whether appropriate password policy is configured for each Dialup Virtual Private Network (VPN), whether 2-factor authentication is being mandated by the WAN interface for VPN connections, whether all endpoints associated with the network segment are being scanned for vulnerabilities, whether ANY interface is being used in specifying any of the security policies, whether a size of the network segment is smaller than a predefined threshold, and whether a peer-to-peer (P2P) protocol or application is running on the private network.

17. A network security device comprising:
a processor; and
a non-transitory computer-readable medium, coupled to the processor, having stored therein instructions that when executed by the processor cause the processor to perform a method comprising:
participating in a dynamic construction of a cooperative security fabric (CSF) interconnecting a plurality of network security devices of a private network of an enterprise in a form of a tree, wherein the tree has a plurality of nodes each representing one of the plurality of network security devices, and wherein the participating in the dynamic construction is based on information regarding hierarchical interconnections between the network security device and one or more directly connected upstream and downstream network security devices of the plurality of network security devices;
receiving information regarding one or more security goals for and to be associated with a network segment of the private network;
identifying a plurality of security criteria based on the one or more security goals;
discovering, by the network security device, a topology of the network segment based on the CSF;
learning security policies implemented by one or more network security devices of the plurality of network security devices that form part of the network segment based on the CSF; and
determining, by the network security device, a plurality of scores, including a score for each of the plurality of identified security criteria by:
analyzing traffic passing through the network segment and observing behaviors of the one or more network security devices responsive thereto;
analyzing respective system configurations of the one or more network security devices;
parsing and evaluating the security policies; and
evaluating performance of the security policies based on the traffic and the observed behaviors; and
facilitating understanding of an overall security posture of the network segment by a network administrator of the private network by generating a scoring metric representative of the overall security posture of the network segment based on the plurality of scores.

18. The network security device of claim 17, wherein the method further comprises anonymously sharing with a community of participating third parties the scoring metric, the plurality of scores, the plurality of identified security criteria, information regarding an industry with which the enterprise is associated, information regarding a geographic region with which the private network is associated and information regarding a size of the private network.

19. The network security device of claim 18, wherein the method further comprises facilitating comparison of the scoring metric to an average of scoring metrics for network segments of private networks reported by the participating third parties.

20. The network security device of claim 18, wherein the method further comprises facilitating comparison of the scoring metric to an average of scoring metrics for network segments of private networks reported by the participating third parties filtered by one or more of industry, geographic region and size of the private networks of reporting entities.

21. The network security device of claim 17, wherein each of the plurality of network security devices is selected from one or a combination of a firewall, an intrusion prevention system (IPS), an intrusion detection systems (IDS) and a Unified Threat Management (UTM) device.

22. The network security device of claim 17, wherein each security criterion of the plurality of identified security criteria has a weight assigned thereto based on a relative importance of the security criterion to the overall security posture and wherein the plurality of scores take into consideration the respective assigned weights.

23. The network security device of claim 22, wherein each security criterion of the plurality of identified security criteria is categorized into a must-have category, a should-have category or a may-have category based on the relative importance of the security criterion to the overall security posture.

24. The network security device of claim 22, wherein the plurality of identified security criteria are selected from one or a combination of whether interfaces are labeled, whether network devices are labeled, whether the one or more network security devices have media access control (MAC) addresses of all connected devices, whether a demilitarized zone (DMZ) and a local area network (LAN) of the private network are mapped with each other, whether network devices of different types form part of the network segment, whether appropriate authentication policies are being used for administrator accounts, whether anti-virus and firewall functionality are enabled on the one or more network security devices, whether sessions are being logged, whether On-Net and Off-Net are enabled for defined network devices, whether post breach detection settings are enabled, whether sandboxing is available for submission of suspicious files, whether a wide area network (WAN) interface of the private network is monitoring and dropping BOTNET Internet Protocol (IP) addresses, whether malicious websites are being blocked for endpoints, whether spam and malicious email is being filtered, whether a web server associated with the private network is adequately protected against Distributed Denial of Service (DDoS) attacks, whether network device performance is being monitored, whether monitoring is taking place to ensure that the one or more network security devices are not exceeding their respective rated capacities, whether appropriate password policy is configured for each Dialup Virtual Private Network (VPN), whether 2-factor authentication is being mandated by the WAN interface for VPN connections, whether all endpoints associated with the network segment are being scanned for vulnerabilities, whether ANY interface is being used in specifying any of the security policies, whether a size of the network segment is smaller than a predefined threshold, and whether a peer-to-peer (P2P) protocol or application is running on the private network.

* * * * *